Figure 1:
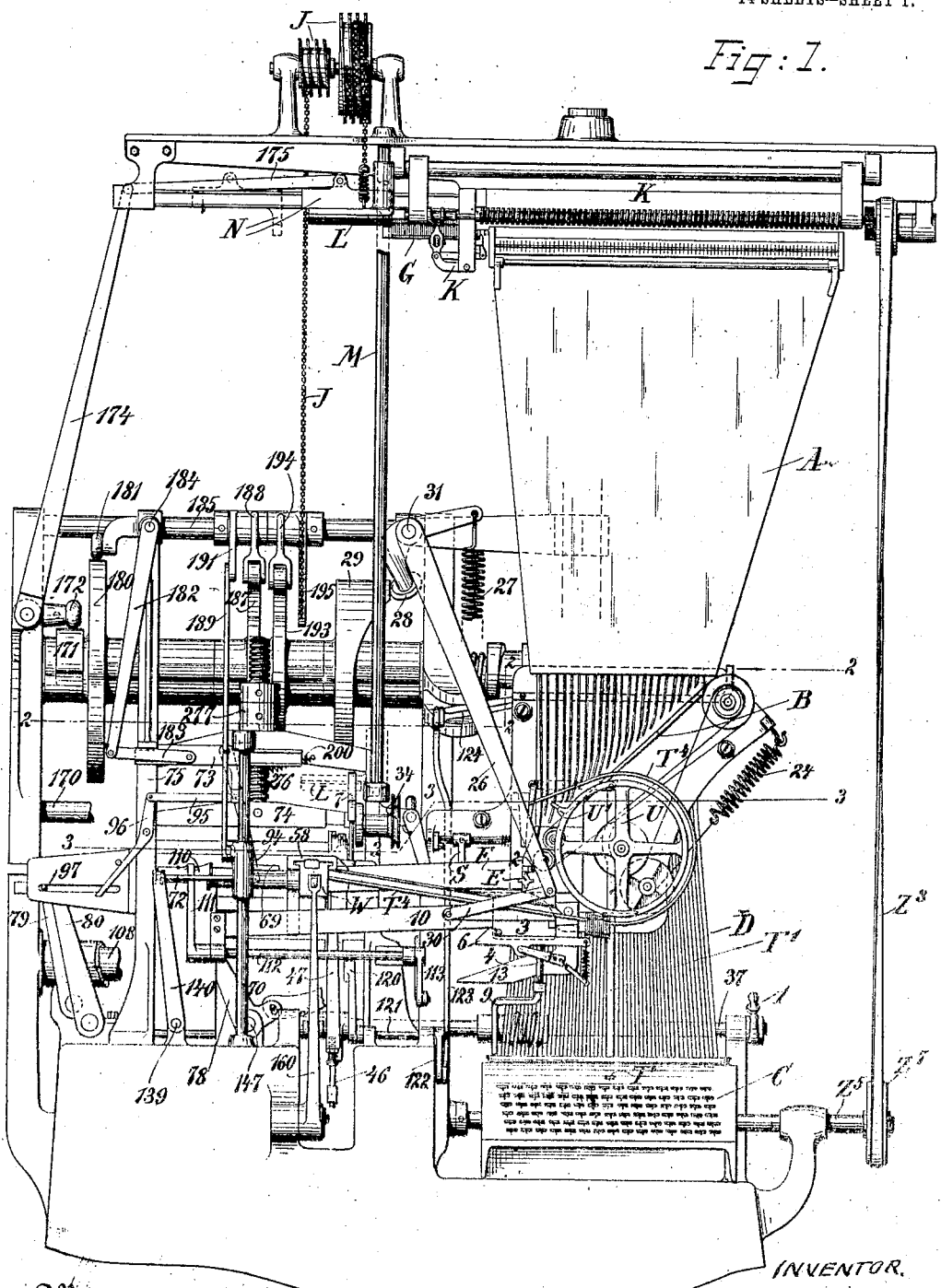

O. MERGENTHALER, DEC'D.
SAFE DEPOSIT AND TRUST COMPANY OF BALTIMORE & A. GREENLEAF, EXECUTORS.
TYPOGRAPHIC MACHINE OR MACHINE OF LIKE CHARACTER.
APPLICATION FILED FEB. 6, 1904.

940,071.

Patented Nov. 16, 1909.

14 SHEETS—SHEET 1.

O. MERGENTHALER, DEC'D.
SAFE DEPOSIT AND TRUST COMPANY OF BALTIMORE & A. GREENLEAF, EXECUTORS.
TYPOGRAPHIC MACHINE OR MACHINE OF LIKE CHARACTER.
APPLICATION FILED FEB. 6, 1904.

940,071.

Patented Nov. 16, 1909.

14 SHEETS—SHEET 2.

Witnesses

Inventor

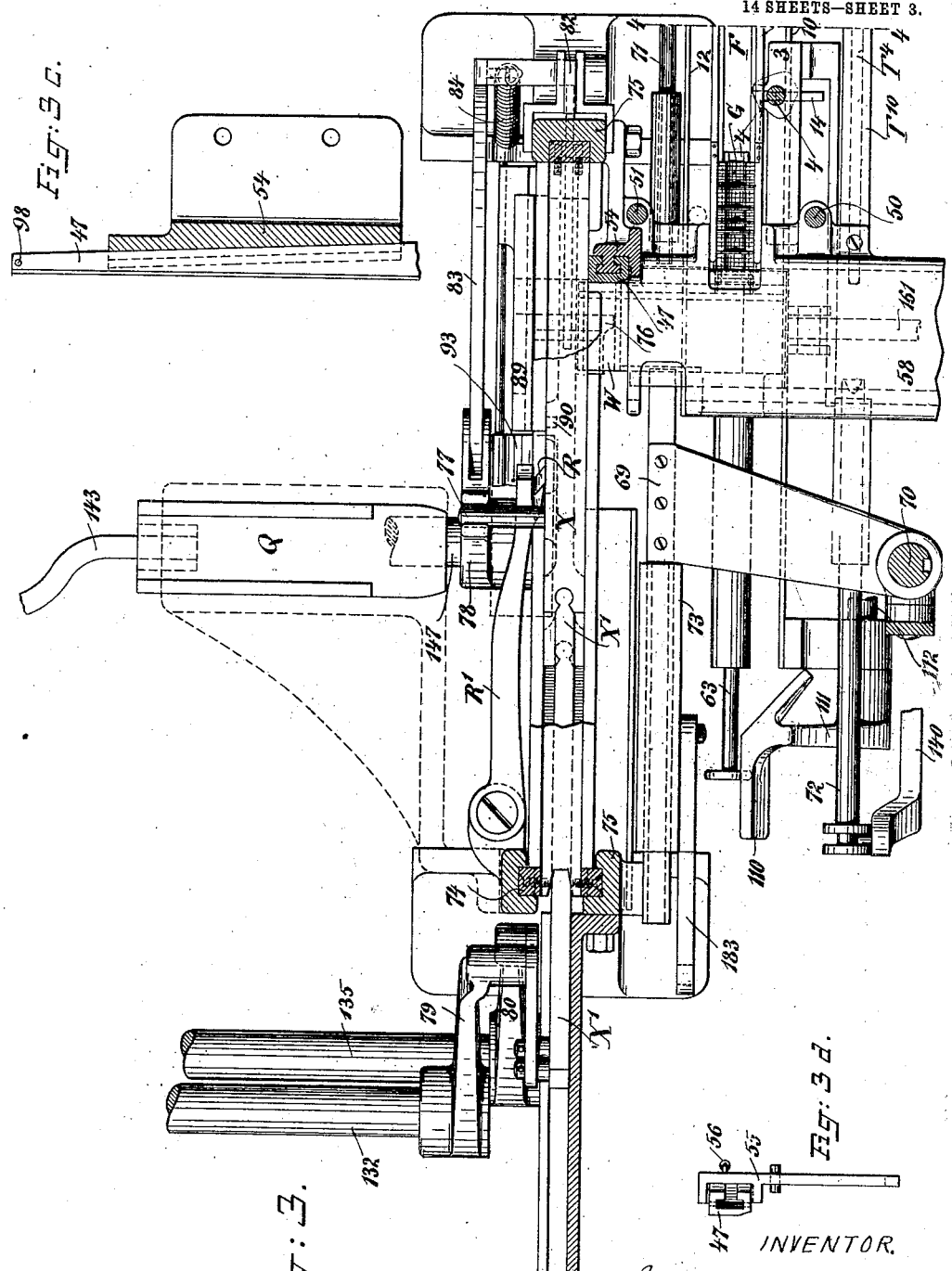

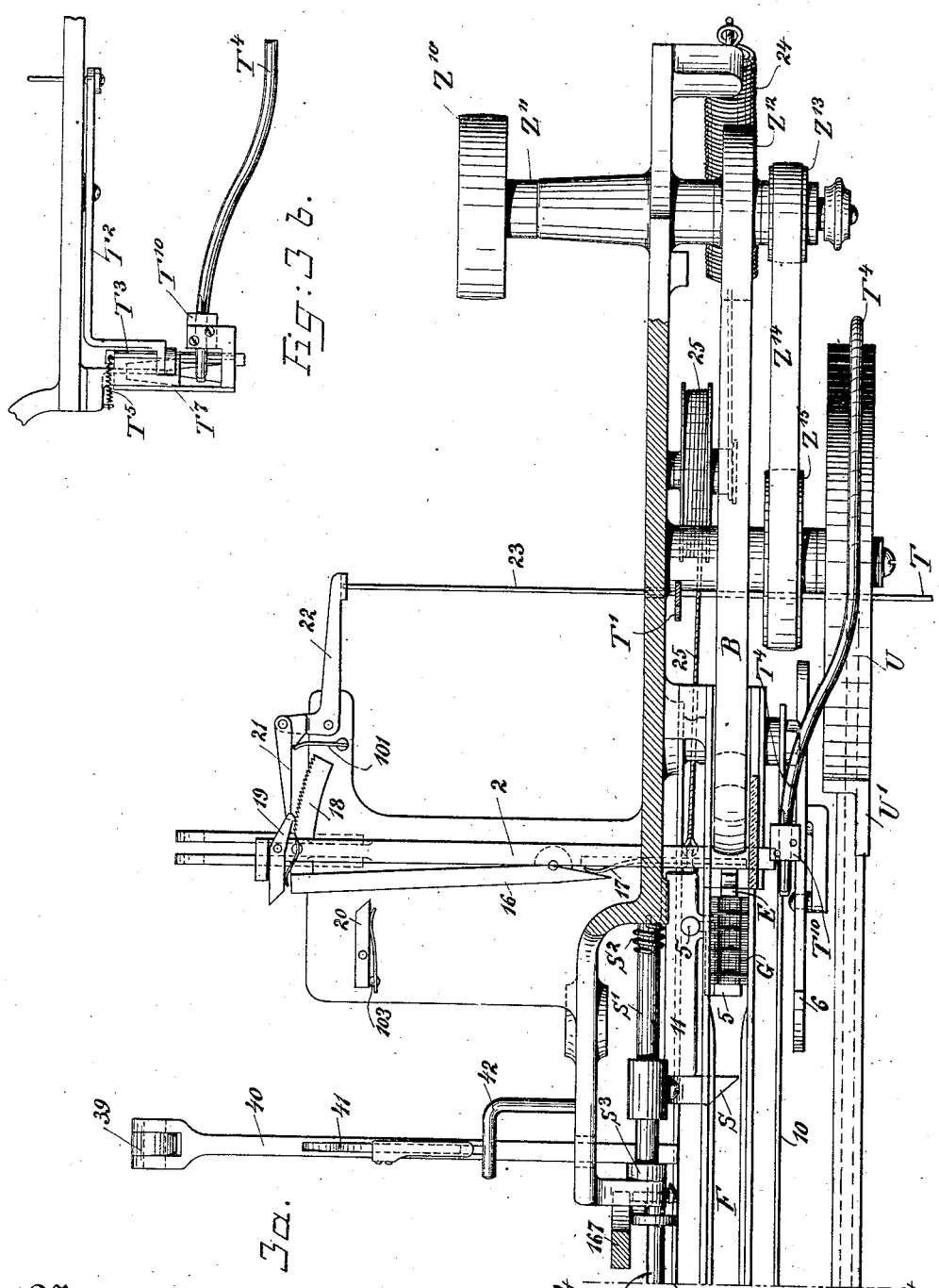

O. MERGENTHALER, DEC'D.
SAFE DEPOSIT AND TRUST COMPANY OF BALTIMORE & A. GREENLEAF, EXECUTORS.
TYPOGRAPHIC MACHINE OR MACHINE OF LIKE CHARACTER.
APPLICATION FILED FEB. 6, 1904.
940,071.
Patented Nov. 16, 1909.
14 SHEETS—SHEET 5.
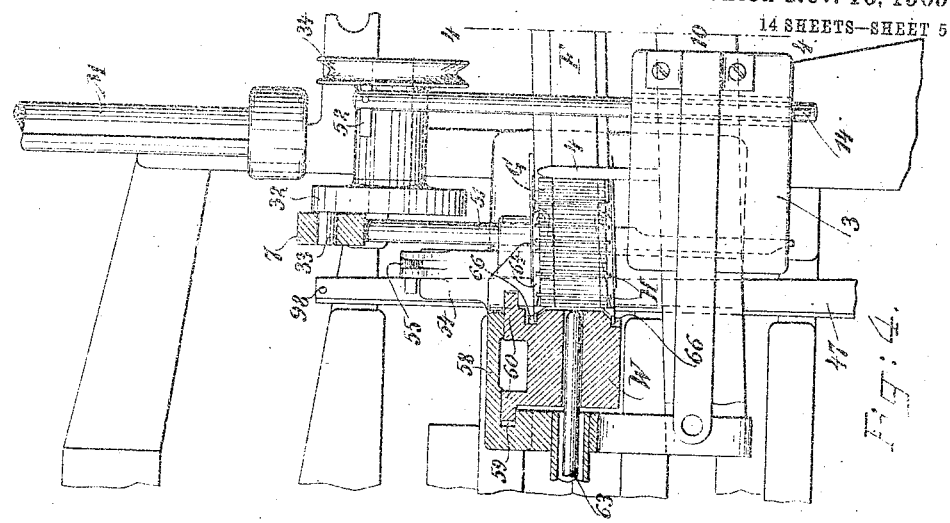
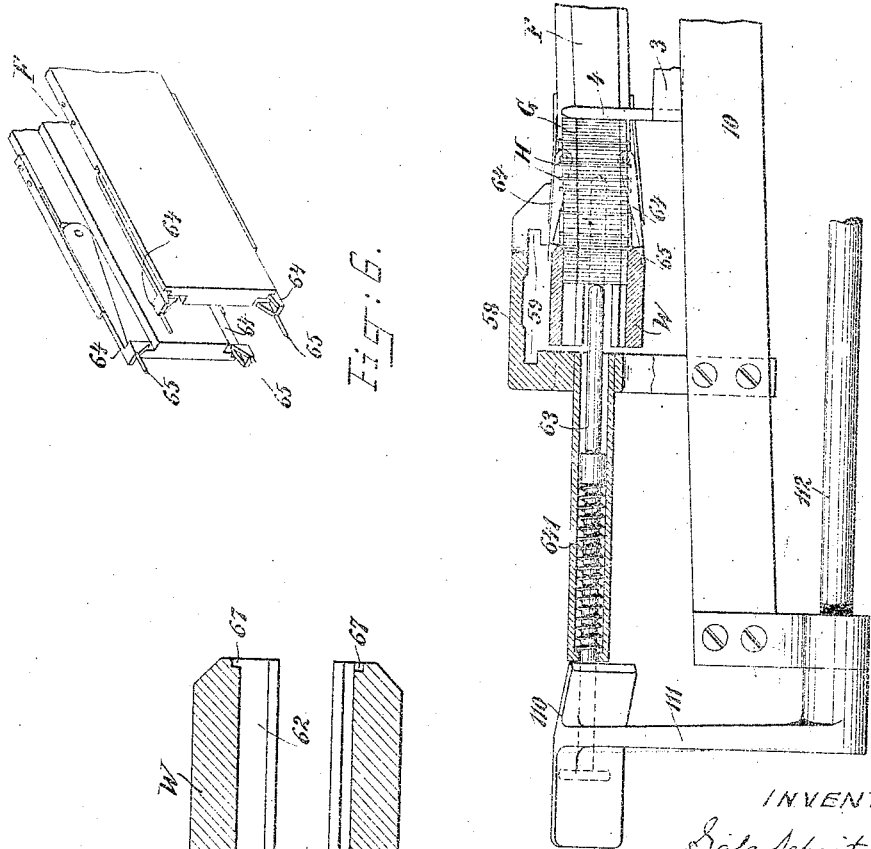
INVENTOR.
Safe Deposit and Trust Co.
of Baltimore,
Abner Greenleaf
Exrs. Estate of O. Mergenthaler
Dec'd.
By Philip T. Dodge Atty.
Witnesses
F. Petri-Palmedo
A. M. E. Kennedy

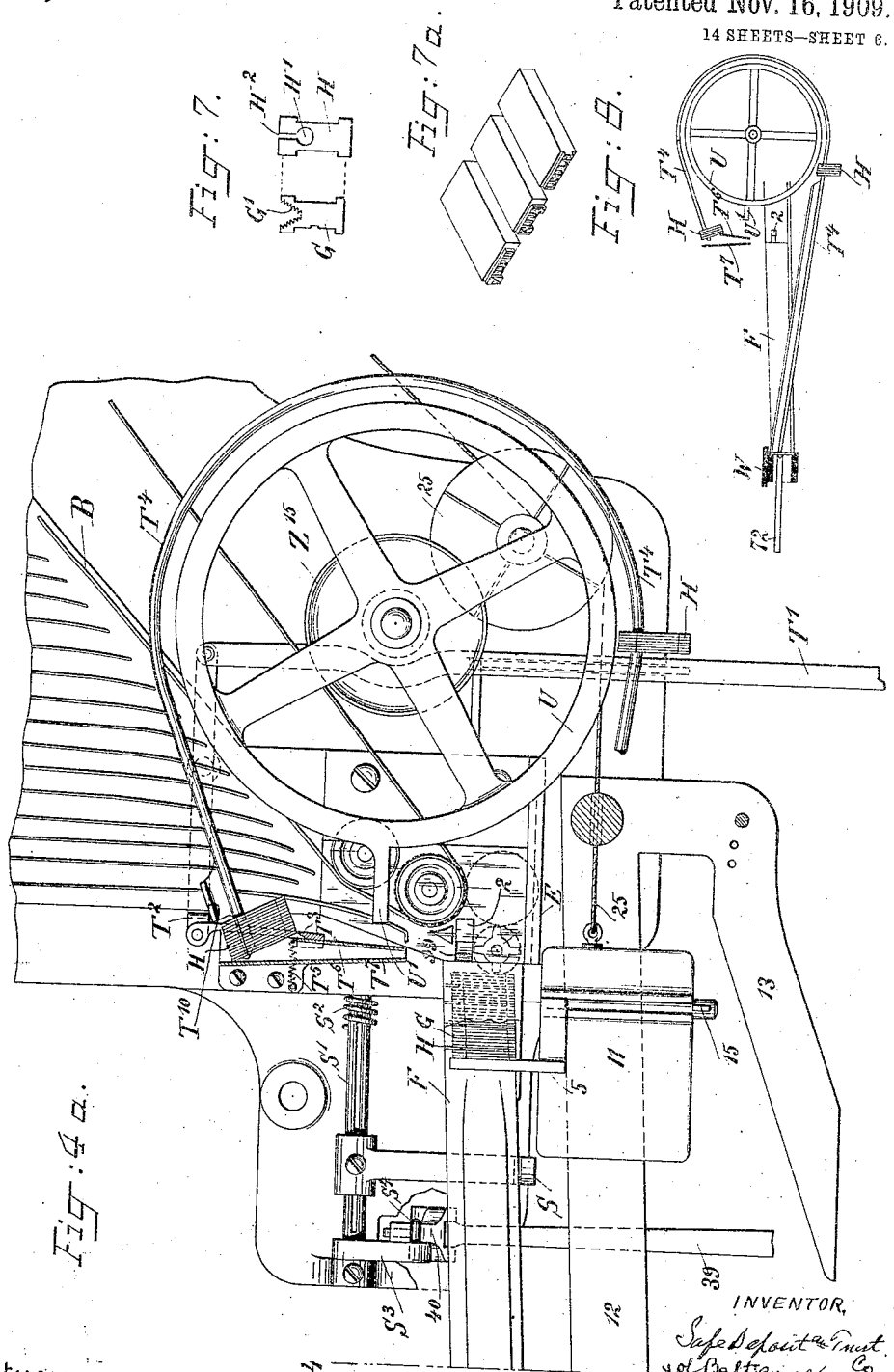

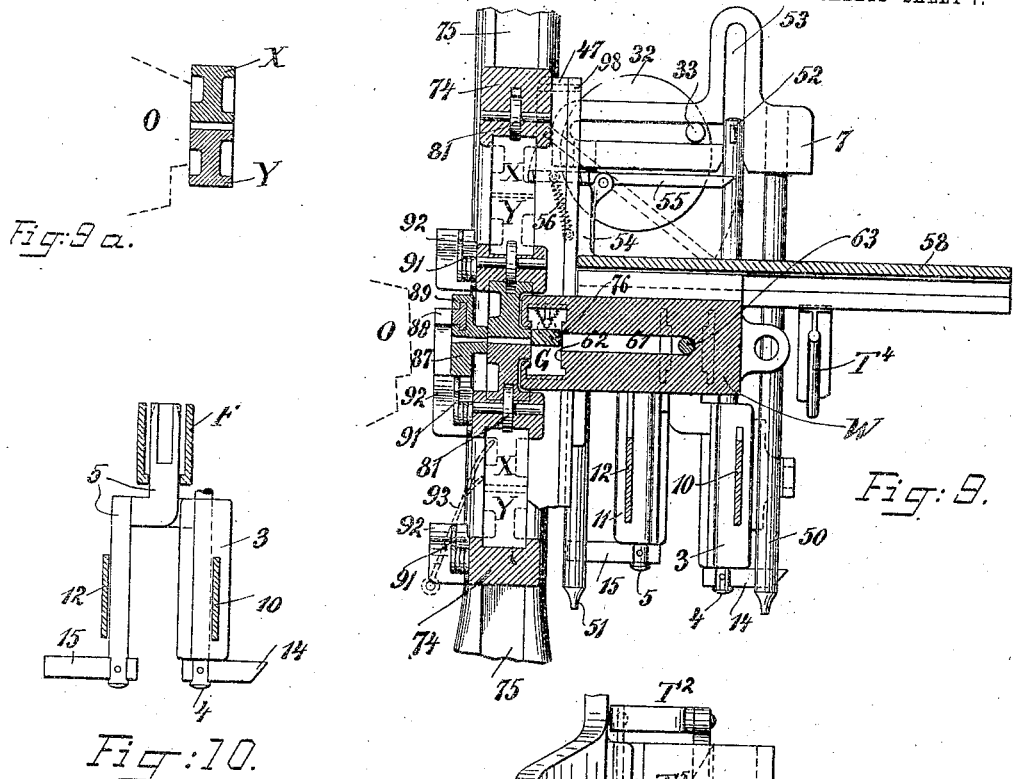

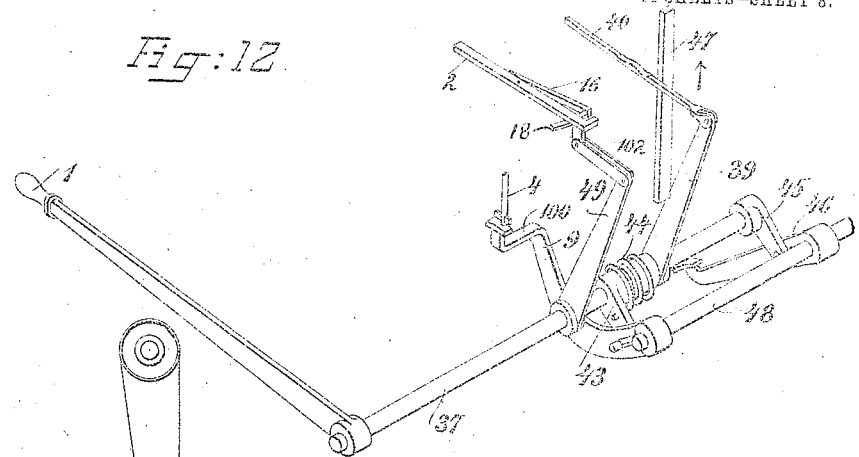
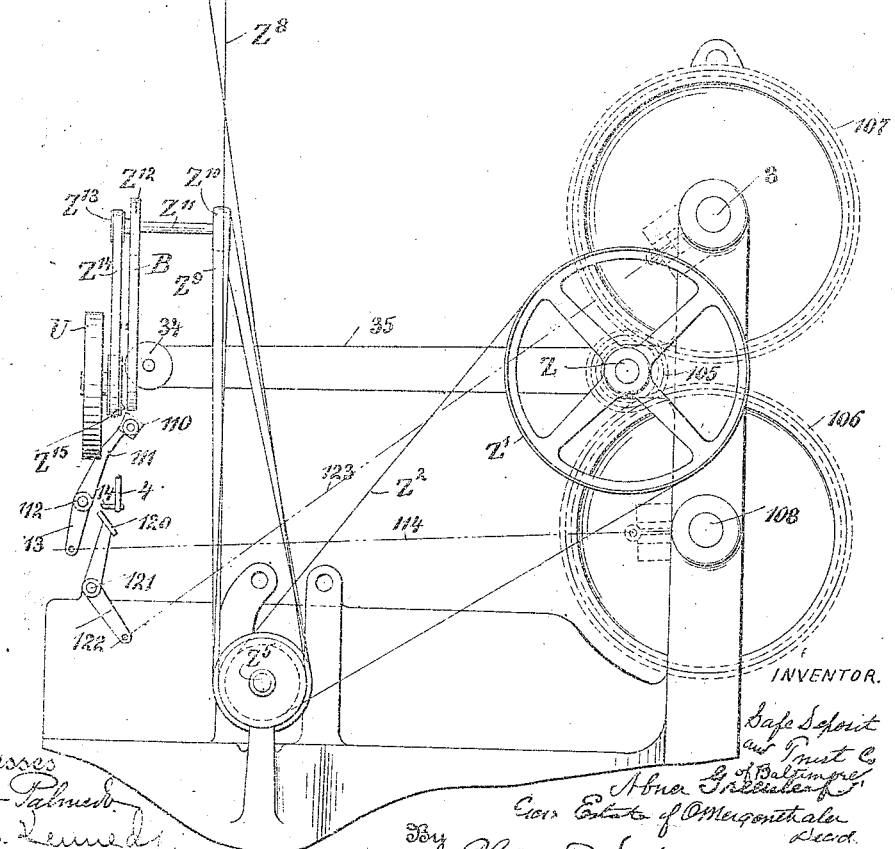

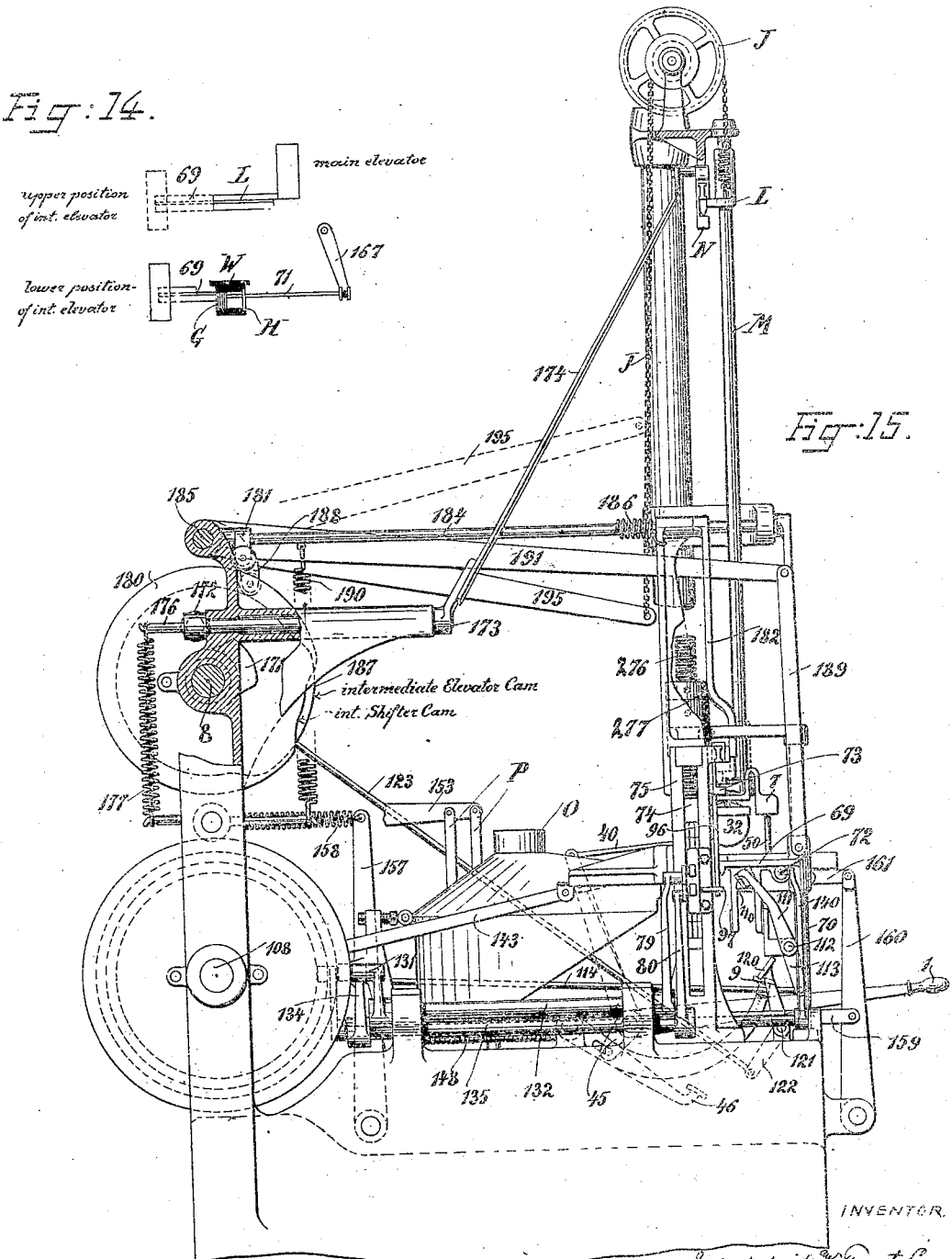

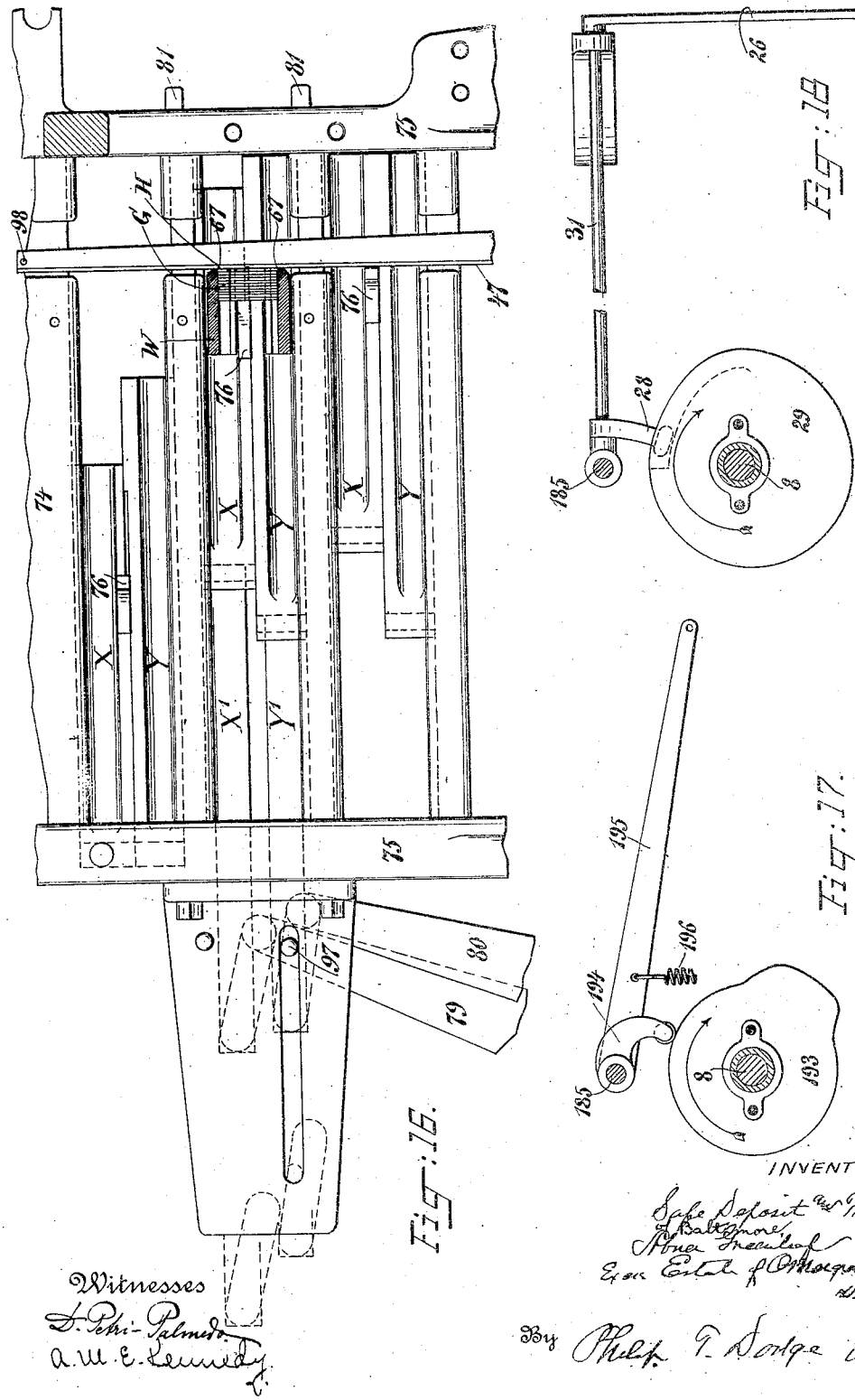

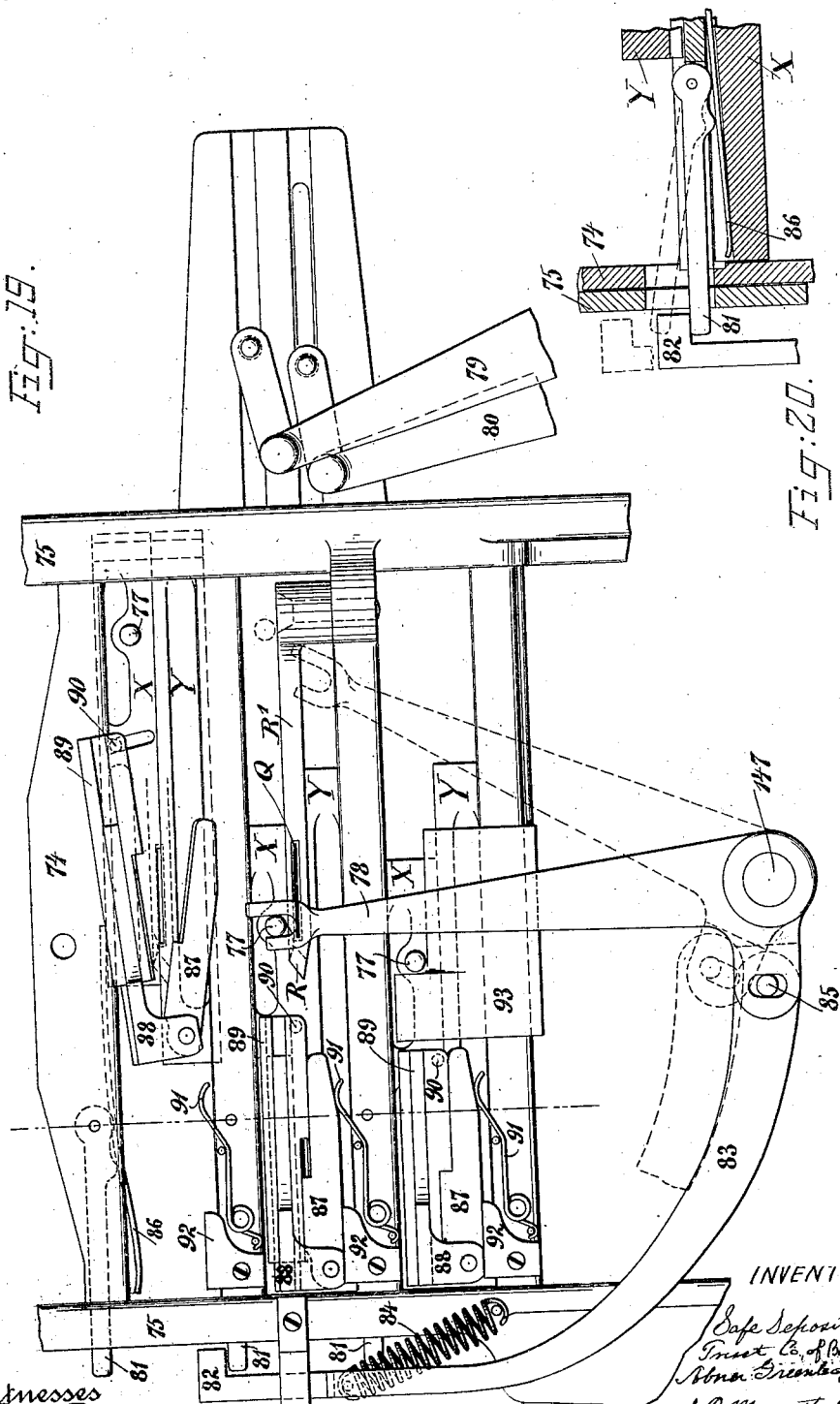

O. MERGENTHALER, DEC'D.
SAFE DEPOSIT AND TRUST COMPANY OF BALTIMORE & A. GREENLEAF, EXECUTORS.
TYPOGRAPHIC MACHINE OR MACHINE OF LIKE CHARACTER.
APPLICATION FILED FEB. 6, 1904.
940,071.
Patented Nov. 16, 1909.
14 SHEETS—SHEET 12.
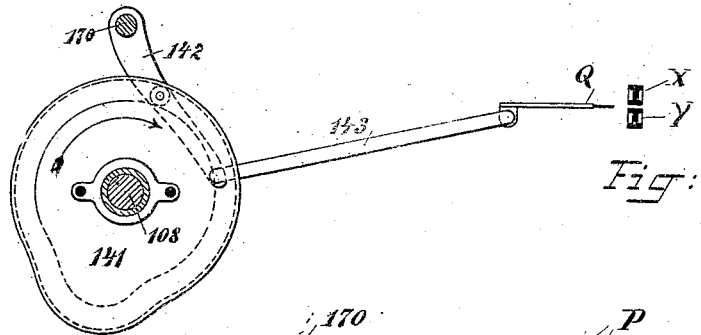
Fig: 21.
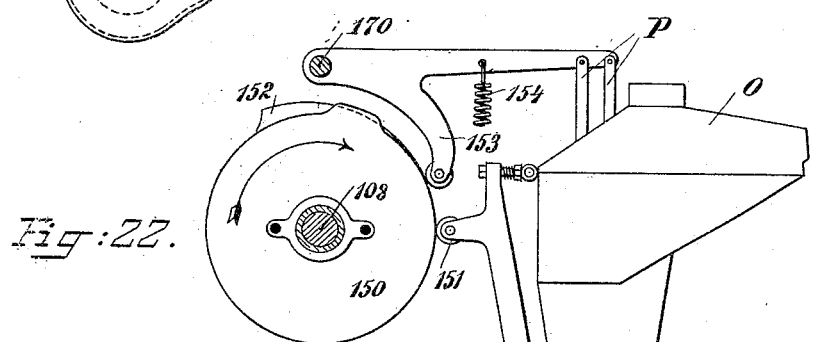
Fig: 22.
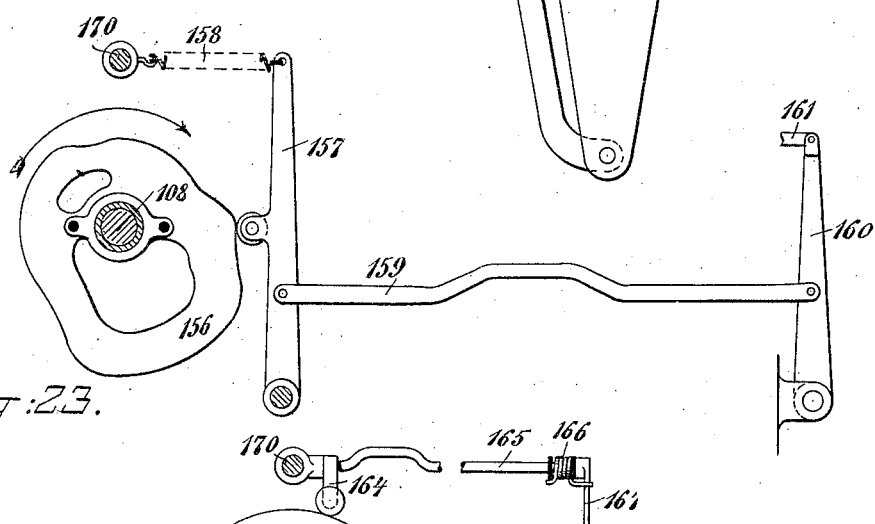
Fig: 23.
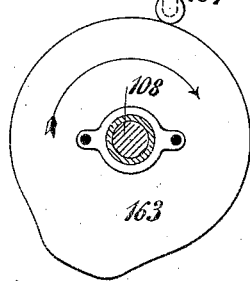
Fig: 24.
INVENTOR
Safe Deposit and Trust Co.
of Baltimore
and A. Greenleaf
Exors. Estate of O. Mergenthaler
dec'd
By Philip T. Dodge Atty.
Witnesses
D. Petri-Palmed
A. M. E. Kennedy O. MERGENTHALER, DEC'D.
SAFE DEPOSIT AND TRUST COMPANY OF BALTIMORE & A. GREENLEAF, EXECUTORS.
TYPOGRAPHIC MACHINE OR MACHINE OF LIKE CHARACTER.
APPLICATION FILED FEB. 6, 1904.
940,071.
Patented Nov. 16, 1909.
14 SHEETS—SHEET 13.
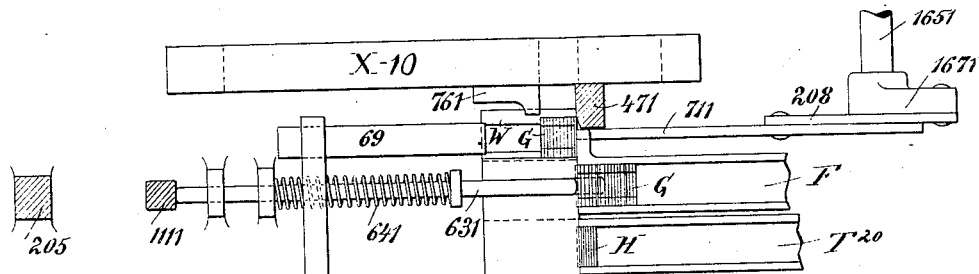
Fig: 25.
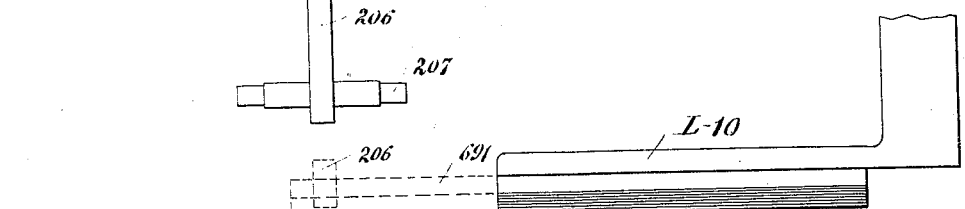
Fig: 26.
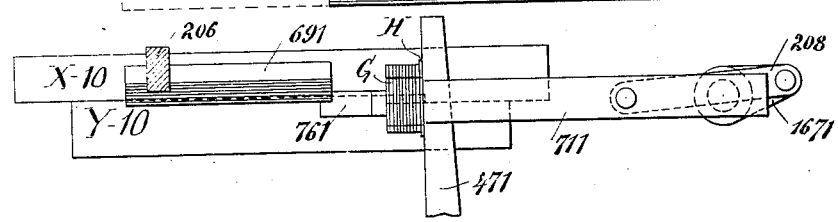
Fig: 27.
Witnesses
INVENTOR.
By Philip T. Dodge Atty.

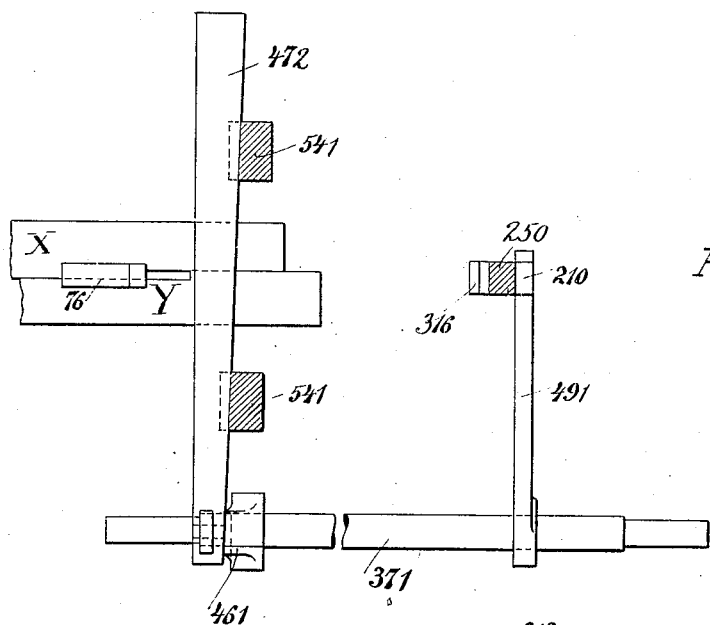
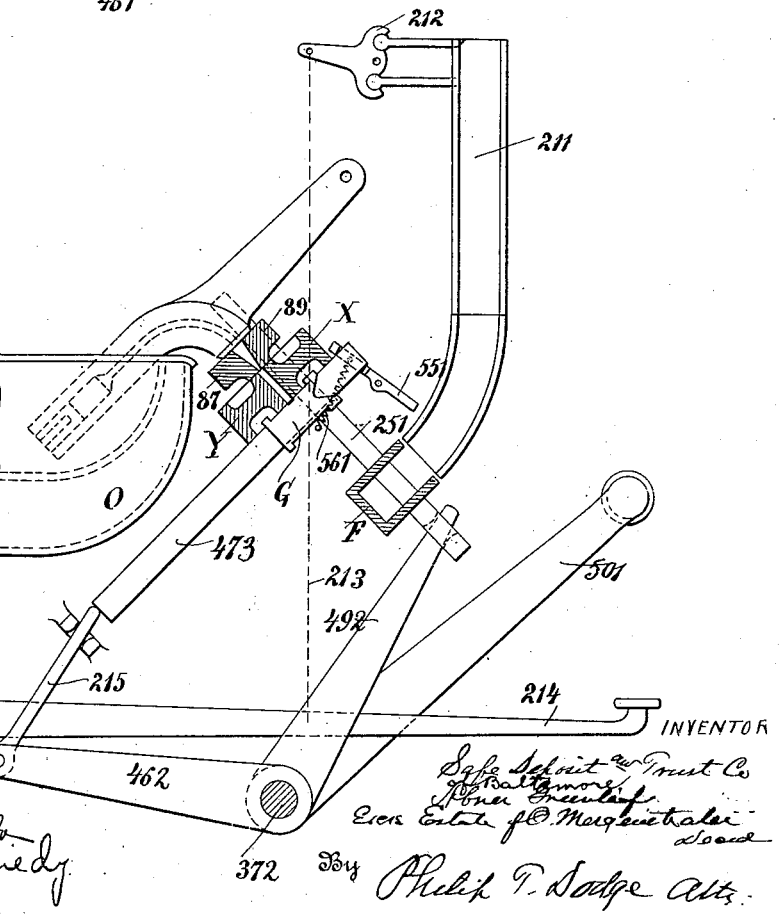

UNITED STATES PATENT OFFICE.

SAFE DEPOSIT AND TRUST COMPANY OF BALTIMORE AND ABNER GREENLEAF, OF BALTIMORE, MARYLAND, EXECUTORS OF OTTMAR MERGENTHALER, DECEASED, ASSIGNORS TO MERGENTHALER LINOTYPE COMPANY, A CORPORATION OF NEW YORK.

TYPOGRAPHIC MACHINE OR MACHINE OF LIKE CHARACTER.

940,071.     Specification of Letters Patent.      Patented Nov. 16, 1909.

Application filed February 6, 1904. Serial No. 192,476.

*To all whom it may concern:*

Be it known that OTTMAR MERGENTHALER, late a citizen of the United States, and a resident of the city of Baltimore, in the State of Maryland, now deceased, did invent certain new and useful Improvements in Typographic Machines or Machines of Similar Character, of which the following is a specification.

This invention relates to machines for producing printing surfaces, and more particularly to that class thereof in which are formed lines of logotypes or integral words in place of single type or linotypes, thus substituting the word as the unit of matter for the individual letter or complete line. Each of the words or logotypes thus formed is cast with the proper spacing blank attached thereto, so that when assembled they form justified matter.

The invention consists in the construction and combination of parts as described in the specification, illustrated in the drawings, and finally pointed out in the claims.

Many of the features of the invention are capable of extensive application, although for the purpose of this case it is shown in connection with an organized machine; but it will be understood that different applications thereof may be made, and that many changes and variations therein are possible without departing from the spirit of the invention.

The general operation of the organized machine is specifically as follows: The characters are arranged and the line is composed with thin space blanks between the words of outside dimensions which overreach the matrices at the top and bottom. When the line contains as much matter as it will take or is desired, a lever is operated whose first act is to liberate the line delivery slide thus causing the slide to compress the line against a stop bolt in the assembling or delivery channel. The further downward movement of this lever causes a test gage to be inserted between the last matrix and the theoretical end of the line, which action affects the casting apparatus in a way to be described later. On the return stroke of the lever, it withdraws the stop bolt from the delivery channel and the line moves up to the casting mechanism while the front gate in the delivery channel returns to its original position. The operator proceeds to set the next line while the casting apparatus now starts to cast word after word of the line presented to it. The starting of the casting mechanism is effected by the line in its motion to the left arriving on the starting pin and pressing the latter backward with the effect of detenting the machine. In this position the first word has entered a reciprocating slide while the further motion of the line is arrested by the space blank and matrices composing the first word pressing against the slide and the detenting pin respectively. The slide now moves the first word toward the mold, the jaws close up on it, the metal is injected, and the matrices are then moved through the slide and on to the intermediate elevator, from which in turn they are transferred to the regular elevator. The mold moves to the left so as to clear obstructions for the ejection of the type and to obtain suitable room for the galley. These operations will repeat themselves until the last word of the presented line has been received and disposed of, when the apparatus will come to rest.

The general operation of the means for delivering the assembled line to the presentation slide is as follows: The delivery slide and its movable gate normally occupy a position with the latter in line or even with the end of the line to be composed. Near it is a movable gate or yielding resistant which prevents the matrices from turning over and recedes as the composition is progressing. The measuring device or test gage crosses the end of the line and is opened one tooth every time a space blank is inserted. When the line has as many words as it will take, the starting lever is operated, and its first action is to trip the pawl and detent the line delivery slide which carries the line to the left until arrested by the movable stop. The line will now rest until the test gage through the action of the starting lever has been carried far enough across the end of the line to take up all the space left unfilled, when its further motion will cease, and the starting lever then continues its motion until it has withdrawn the movable stop, thus liberating the line completely and allowing it to be carried to the casting mechanism. When it arrives there a reciprocating piece or shover forces the front gate below the assembled line, when it returns to its normal position in readiness for another line. When the last word of the line has been delivered to the casting apparatus, the rear gate of the line delivery slide is acted upon by the reciprocating piece or shover and is forced down in the same way as the front gate. Unlike the front gate, the rear gate does not return at once but remains hanging below the line in order to pass the front gate on its return motion. The rear gate in its extreme position at the left contacts with a detenting mechanism and thus liberates a cam shaft by the action of which it is returned to its original position where it may be replaced in the line by an arm on the starting shaft.

Reference has been made to the use of a test gage for the purpose of effecting the justification. The underlying idea involved in this mechanism is to ascertain the total amount of space left unfilled in the line, to divide it by the number of spaces the line contains, and to add that amount of space to each word. This end is accomplished in the following manner: The test gage is formed of two pieces and normally has parallel sides. When a space blank is inserted in the line the test gage is opened a given amount so as to make it a wedge. In other words, it represents a single space, and each further space blank introduced in the line opens the wedge to the same extent, so that when the line is completed the taper of the wedge is in proportion to the number of space blanks in the line. It follows from this that if we use a wedge as one of the vise jaws at the caster, of a taper proportionate to the taper given the test gage by the action of a single space key, and cause the justifying wedge or jaw to move the same distance that the test gage travels through the line, accurate justification of all the words comprising that line must be obtained automatically by the action of the casting apparatus. The wedge or vise jaw is returned by the action of the delivery slide before the last word is cast as that word requires no space, due to the fact that the number of justifying spaces in the line is one less than the number of words.

Figure 2A:
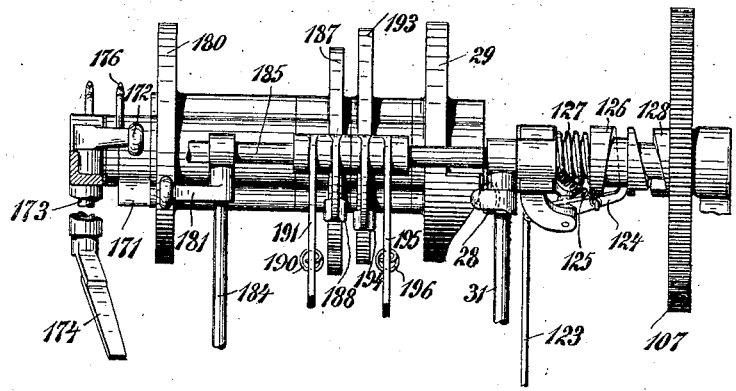
Figure 2:
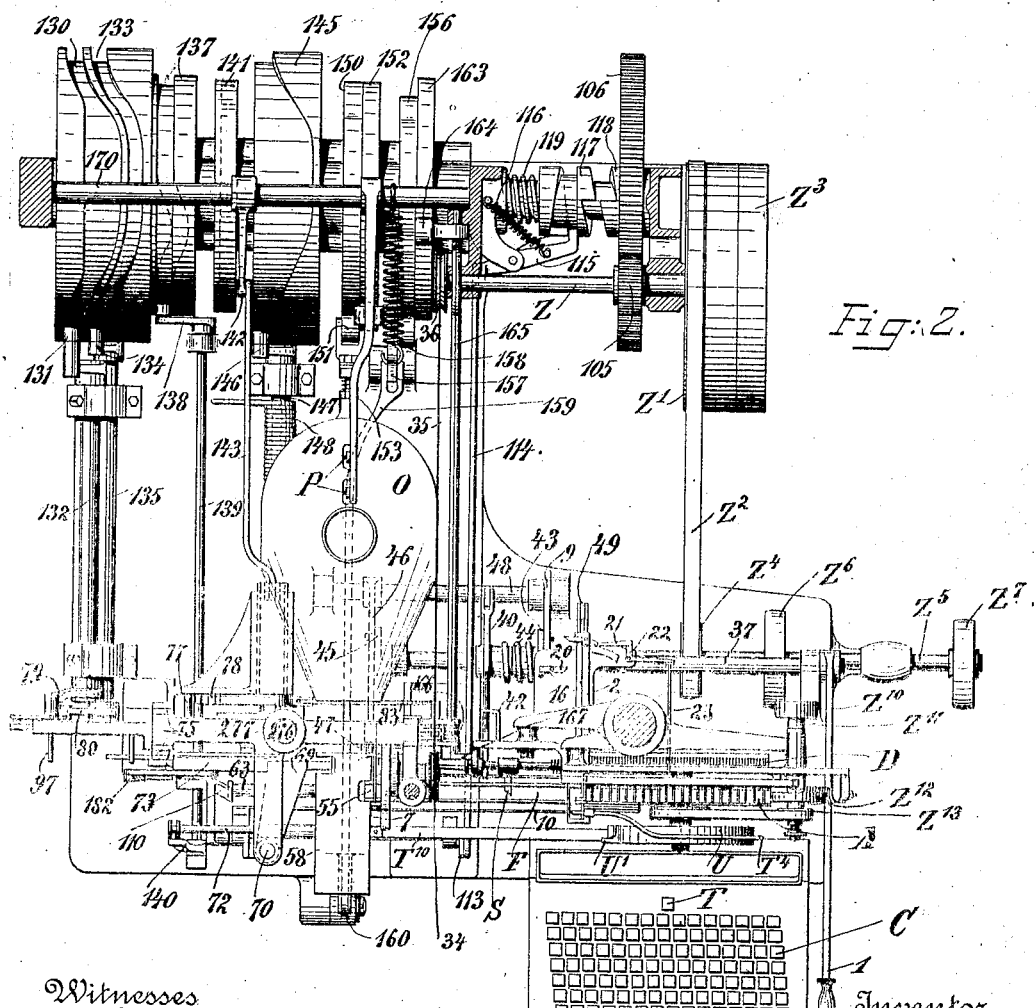

Referring now to the drawings: Figure 1 is a front view of a sufficient portion of the organized machine to show the application of the invention thereto. Fig. 2 is a sectional plan view taken substantially on the line 2—2 in Fig. 1. Fig. 2ª is a detached view of the upper cam shaft and connected parts. Fig. 3 is an enlarged sectional plan view taken substantially on the line 3—3 in Fig. 1. Fig. 3ª is a similar sectional view, constituting an extension of Fig. 3, the line 4—4 in both figures indicating the point of separation. Fig. 3ᵇ is a detail plan view of the space blank escapement. Fig. 3ᶜ is a longitudinal section of the mold wedge jaw. Fig. 3ᵈ is a detail of the retaining means for the wedge jaw. Fig. 4 is a partial vertical sectional view on an enlarged scale, corresponding in part to Fig. 3, the line of section being substantially through the center of the delivery channel. Fig. 4ª is a similar view to Fig. 4, and may be regarded as an extension thereof, the line 4—4 in both figures indicating the point of separation. Fig. 5 is a partial longitudinal sectional view similar to Fig. 4, but showing different parts and the presentation slide in a different position. Fig. 5ª is a sectional detail of the end of the matrix chamber in the presentation slide. Fig. 6 is a detail perspective view on an enlarged scale showing the end of the delivery channel. Fig. 7 is a detached view of the matrix and space blank. Fig. 7ª shows several completed logotypes. Fig. 8 is a diagrammatic view of the space blank devices. Fig. 9 is a transverse vertical section of the molds and presentation slide. Fig. 9ª is a detail presenting a different form of mold. Fig. 10 is a transverse vertical section of the delivery channel, showing the relation thereto of the movable gates. Fig. 11 is a transverse vertical section through the delivery channel, showing particularly the movable line stop and connected parts. Fig. 12 is a perspective view of the starting lever and shaft and connected parts. Fig. 13 is a diagrammatic view illustrating the arrangement of the driving parts. Fig. 14 is a diagrammatic view showing the relation of the intermediate and main elevators. Fig. 15 is an end view of the machine partly broken away. Fig. 16 is a front view of the molds and mold frame showing the presentation slide in section. Fig. 17 is a detached view of the main elevator cam and levers. Fig. 18 is a detached view of the cam and connected parts for operating the delivery slide. Fig. 19 is a rear view of the mold frame and connected parts. Fig. 20 is a sectional detail illustrating the locking devices for the mold. Fig. 21 is a detached view of the cam and connected parts for operating the ejector. Fig. 22 is a detached view of the cams and connected parts for operating the pot and the pump plungers. Fig. 23 is a detached view of the cam and connected parts for operating the presentation slide. Fig. 24 is a detached view of the cam and connected parts for effecting the transfer of the matrices to the intermediate elevator. Fig. 25 is a detail plan view illustrating certain of the parts in different forms. Fig. 26 is a front view corresponding to Fig. 25. Fig. 27 is a detail plan view showing a different arrangement of certain of the parts. Fig. 28 is a front view corresponding in part to Fig. 27. Fig. 29 is a transverse sectional view of a different arrangement of parts.

*The logotypes.*—The logotypes which are the product of the organized machine are shown in Fig. 7ª and are all (except the last one) formed with a justifying or spacing portion integral therewith, so that when assembled they fill out the predetermined length of line and form justified matter. The characters for the entire line are arranged at one time, the line consisting of a plurality of individual letter matrices with thin space blanks between the words, thus constituting a line of word matrices, each word matrix being formed of the necessary letter matrices and the thin space blank at the end thereof. The matrices and space blanks are assembled so as to fill out as far as possible the prescribed measure, and the word matrices are subsequently separated one by one, and the logotypes cast individually and consecutively therefrom. The space remaining to be filled out in the assembled line is apportioned among the several logotypes and cast thereon, the justifying space on each logotype being that represented by the space blank thereof and the apportioned amount added thereto. It therefore follows that each of these logotypes is longer than the corresponding word matrix, and that the assembled line of logotypes is longer than the assembled line of matrices and space blanks. As the number of spaces necessary to justify the line is one less than the number of words, the last logotype is cast without the justifying space and is therefore of the same length as the corresponding word matrix.

*Matrix and space blank.*—The specific forms of the matrices and space blanks employed in this machine are unimportant, although for purposes of illustration such forms have been selected as are illustrated in Fig. 7. The matrix G is provided with distributing teeth $G^1$, and is similar to the matrix used in connection with the commercial Mergenthaler linotype machine. The thin space blank H, as shown, is somewhat longer than the matrix and is formed with an interior recess $H^1$ to engage the rod $T^4$, and a slot $H^2$ to permit the space blank to pass the supports $T^{10}$, $T^{10}$ of the rod $T^4$.

*Assembling and distributing means.*—The specific forms of the selecting and distributing means for the matrices constitute no part of this invention, as any suitable form thereof may be employed. The invention proper relates to mechanism for dealing with the line of matrices after it is assembled and up to the point when the matrices have passed through the casting mechanism, and would therefore be completely operative if the matrices were assembled and distributed by hand. Thus any selecting and distributing means known in the art could be used, such for instance as those described and illustrated in the U. S. Letters-Patent to Ottmar Mergenthaler, Nos. 345,526; 347,629; 347,630; 378,797; 378,798; 392,446; 436,531; 436,532; and 678,268. For the purposes of illustration means are shown herein somewhat similar to those presented in the last mentioned patent No. 678,268, and this general organization of machine has been followed in other respects also.

The matrices are stored in the magazine A (see Fig. 1) and are released therefrom as selected by the manipulation of keys C acting through the connections D on escapement devices in the magazine, the matrices falling on the traveling belt B and being delivered in the assembly channel F in front of the star wheel E. After the matrices have passed through the casting mechanism they are transferred to the main elevator L, which moves from its lowermost to its distributing position on the vertical shaft M, these movements being imparted to the elevator L by the cord and pulley arrangement J—J. In the upper position of the elevator L the matrices G are moved by the shifter slide N into engagement with the distributing devices K—K, all as described in the patent referred to. Similarly, any suitable means may be employed to deliver and restore the space blanks, although for the purposes of the present case a special form of device is illustrated, as best shown in Figs. 1, 3, 3ª, 3ᵇ, 4ª and 8. The space blanks H formed with the recesses $H^1$ and $H^2$ are stored upon a curved rod $T^4$ fastened at one end immediately above the delivery point by a bracket $T^{10}$, and at its other end by a similar bracket $T^{10}$ in proximity to the presentation slide W. Any suitable form of escapement may be employed in connection with the curved rod $T^4$, the one herein illustrated being somewhat similar to that shown in the before mentioned patent No. 678,268. The space blanks H are held by a projection at the end of the rod $T^4$ with their lower ends resting against the side plate $T^6$ of the delivery chute, and are freed from the rod $T^4$, one at a time, by the action of the escapement $T^3$, which is held in close relation with the wall $T^6$ by the spring $T^5$ and is actuated by the lever $T^2$, connection $T^1$ and space key T. The upward movement of the escapement $T^3$ releases the extreme space blank H and permits it to drop between the walls $T^6$ and $T^7$ of the delivery chute into the assembling channel F in front of the star wheel E. In the present instance the space blank delivery mechanism is not shown as located in the same vertical plane with the matrix delivery devices and its chute is therefore properly inclined (see Figs. 3ᵇ and 11) to deliver the space blanks at the proper point. After the words are cast, the space blanks H are ejected, one by one, from the presentation slide W by the rod 72 (see Figs. 3, 3ª, 4ª, and 8), which pushes the space blanks H on to the rod $T^4$, and they descend by gravity to the lowest point of the rod T⁴, where they are engaged by a finger U¹ on the rotating wheel U and are thereby restored to their original position ready for further employment. Motion is imparted to the wheel U by the pulley Z¹⁵, belt Z¹⁴ and pulley Z¹³ on the shaft Z¹¹, as hereinafter described. This connection causes the constant rotation of the wheel U, which however may be arranged to rotate intermittingly if desired. It will be seen that the devices shown for handling the space blanks might also be adapted to matrices with suitable modification.

It will be noted that the machine illustrated embodies the circulating system, that is to say, the matrices and space blanks are returned to their places of storage by a path different from that pursued by them during assemblage, and further that the matrices are independent and free as distinguished from suspended or captive matrices. The space blanks are similarly free when released by the escapement and remain free until ejected from the presentation slide when they are suspended until again released. But as before noted, this invention is not limited to any specific form of matrix or space blank or to any specific mechanisms for handling them.

*Transfer mechanism.*—The matrices G and space blanks H are delivered in the assembling and delivery channel F (see more particularly Figs. 3ª and 4ª) between the star wheel E and the front gate or yielding resistant 5. The star wheel may be operated as shown in U. S. Letters-Patent to Ottmar Mergenthaler, No. 678,268, so as to insure its constant rotation and action upon the rear of the line in course of assemblage in the manner well understood. The matrices and space blanks are maintained in vertical position in the channel F by the spring pressed front gate or yielding resistant 5 and the channel F is inclined from the horizontal for the same purpose and to assist the movement of the line therein. Any suitable means may be employed in connection with the yielding resistant although for the purposes of illustration devices are herein shown similar to those presented in the said Letters-Patent No. 678,268, comprising a cord and pulley arrangement 25—25 connected to the spring 24, the force of which is insufficient to resist the forward pressure of the star wheel E exerted on the front gate 5 through the matrices and space blanks in the assembly channel. The front gate 5 is capable of a vertical movement relative to the slide 11 in which it is mounted, it being formed with a depending rod which fits in a corresponding cylindrical recess in the slide 11 so as to be capable of a frictional movement therein. The lower part of the gate 5 is provided (see Figs. 4ª and 9) with a projecting piece 15 which controls the vertical adjustment of the gate 5 in the slide 11 in the manner hereinafter to be described. The slide 11 is mounted upon the guide rod 12, and the tendency of the spring 24 is to restore the slide 11 to its extreme right-hand position unless displaced by other means. The rear gate 4 is similarly mounted in the delivery slide 3, which moves upon the guide rail 10 (see Figs. 4, 9 and 10), and is formed with a depending rod which fits closely into a corresponding cylindrical recess in the slide 3 so as to be capable of vertical movement therein, and is provided at its lower end with a projecting piece 14 which controls the vertical adjustment of the gate 4 in the slide 3. The slide 3 when released in the manner hereinafter to be described is normally pressed toward the left-hand end of the delivery channel F by the spring 27 (see Figs. 1, 2ª, and 18) connected to the lever 28 at one end of the rock shaft 31, the other end of the rock shaft 31 being connected to the delivery slide 3 by the arm 26 and link 30. The return movement of the slide 3 to its right-hand position is effected by the lever 28 and cam 29 on the upper cam shaft 8. The particular means employed to effect the movements of the delivery slide, as described, are substantially the equivalents of those presented in Letters-Patent Nos. 436,532 and 557,000. The slide 3 is held in its initial position by the spring actuated pawl 6 (see Figs 1 and 3ª) suitably pivoted to the frame and engaging a pin on the slide 3. The starting lever 1 is fast on the rock shaft 37 (see Figs. 1, 2, 12 and 15). An arm 43 (see Fig. 12) is loosely mounted upon the rock shaft 37 and is connected thereto by a spiral spring 44 attached at one end to the arm 43, and at the other end directly to the shaft 37 or to the hub of lever 39 fast thereon. The arm 43 engages (preferably by a pin and slot connection) with the arm 9, which is pivotally mounted upon the rod 48 and has an offset projection 100 at its outer extremity so located that in its upward movement the projection 100 will engage the lower end of gate 4 and raise it to its operative position in the slide 3 behind the assembled line of matrices alongside the last matrix delivered to the line, and the further movement of the arm 9 will trip the pawl 6 so as to free the delivery slide 3 whereupon the spring 27 will advance it toward the casting mechanism, the spring 27 being sufficiently strong to overcome the effect of spring 24, connected as described to the slide 11.

It will be understood that while the line of matrices is being assembled, the rear gate 4 remains inactive below the assembling channel F but at the rear end thereof ready to be projected therein behind the last matrix when the line is completed, as above described, so that the gate will act under the influence of its spring 27 to shift the line along to the left to the casting position.

The movement of the line by the gate 4 to its extreme left-hand position is temporarily prevented by the movable line stop or bolt S which projects across the delivery channel F (see Figs. 3ª, 4ª and 10) and therefore arrests the movement of the gate 5. The line stop or bolt S may be of any suitable or desired construction, but for purposes of illustration the form presented in the Patent No. 678,268 has been shown in the drawings, and consists of a bent arm S adjustably mounted upon the rock shaft S¹, a spring S² being also connected to the rock shaft S¹ in such manner as to hold the stop S across the channel F unless removed therefrom in the manner subsequently to be described. The capability for longitudinal adjustment of the arm S on rock shaft S¹ enables the length of line to be altered at will.

*Measuring devices.*—It is at this point of the operation of the machine that the shortage in the assembled line is measured by the test gage or angle bar now to be described. The particular form of measuring device or test gage employed may be varied considerably without departing from the spirit of the invention, for instance, somewhat similar devices are presented in the U. S. Letters-Patent to F. A. Johnson, Nos. 463,388, 584,361, and 607,045, and to W. Berri, No. 612,010. The present embodiment of the measuring device is best illustrated in Figs. 2, 3ª, 11 and 12, and comprises a main branch 2 arranged horizontally on the framework and projecting through a slot 99 immediately above the star wheel E (see also Fig. 4ª). A movable member 16 is pivotally connected to the main branch 2 and a spring 17 is interposed between the two members, the normal tendency of which is to hold the part 16 in parallelism with the part 2. The outer end of the member 16 is provided with a toothed projection or segment 18 and a spring pressed detent 19 on member 2 engages therewith and thus holds the member 16 in its adjusted angular position against the pressure of the spring 17. An elbow lever 22 carrying an actuating pawl 21 is pivoted to the frame-work in close proximity to the toothed projection 18. The elbow lever 22 is normally pressed outward by the spring 101, its farther end being then located in the path of the plate 23 upon the space blank rod T¹ (see Figs. 3ª and 11). It thus follows that each time a space blank is introduced into the line, through the connections described, the member 16 will be opened to the extent of one of the teeth on the segment 18 by the pawl 21 and held in this position by the detent 19. In other words, the angularity of the wedge will depend upon the number of words in the line.

After a line has been assembled and moved forward in the manner previously described against the stop S, the test gage is advanced through the slot 99 behind the rear gate 4 until its further movement is prevented by the contact of the extended member 16 with the said gate, the stop S serving as an abutment at the front end of the line and the slot 99 in the frame-work at the rear end of the line. This motion is imparted to the test gage by the arm 49 fast upon the starting shaft 37 and connected to the member 2 by a link 102 (see Fig. 12). The extent of the motion of the test gage through the line obviously depends upon the angularity of the wedge, and because of its rigid connection thereto the movement of the rock shaft 37 will be similarly limited, and through the mechanism subsequently to be described the justifying wedge member or clamping jaw 47 at the casting mechanism is correspondingly set to effect the proper and equal justification of all the words presented to it. A spring pressed piece 20 (see Fig. 3ª) is pivoted to the frame in proximity to the member 16 and so arranged that in the forward movement of the test gage it will be moved out of the way against the force of its spring by the rear end of the pivoted detent 19. When the test gage is afterward withdrawn to its normal position the rear end of detent 19 will again contact with the piece 20, the outer end of which rests upon an abutment 103, thus effecting the pivotal movement of detent 19, the release of the toothed segment 18 therefrom, and the restoration of the member 16 to its normal parallel position by spring 17.

*Justifying member.*—The justifying wedge member 47 which constitutes one of the mold jaws (see Fig. 12) is adjusted by the arm 46 pivotally mounted on the rod 48 and connected to the starting shaft 37 by the arm 45 rigidly mounted thereon. As previously explained the extent of rotation of the shaft 37 is limited by the movement of the test gage and therefore the upward adjustment of the justifying wedge member is always exactly proportionate to the movement of the test gage. In other words, the position of the justifying member is controlled by the number of intervals between the words of the line and the full measurement of the assembled line. The proper relative proportions of the test gage and justifying member are matters of simple calculation, it being necessary to take into account the length of the composed line of matrices and space blanks and the thickness of the front and rear gates respectively, as well as the fact that in each word matrix except the last a space blank is presented in the casting position between the mold jaws. Of course, if the space blank be removed before the word matrix is presented to the mold, this last element need not be regarded, as in that case, the justifying space on the logotype will be formed entirely by the justifying member. Similarly, variations in the form or mode of employment of the front and rear gates might alter the calculation necessary because of these elements. It is to be noted that the justifying wedge 47 constitutes a clamping jaw and therefore is one of the mold members, the general idea involved being the connection of a measuring device to a mold member in order to set the latter and thus secure proper justification, or even more generically the employment of such a measuring device to effect the justification through any suitable means.

The line having been measured and the justifying member set, the line is now freed from the stop S in order to permit the rear gate 4 to carry it forward to the casting mechanism. The withdrawal of the stop S is effected from the starting shaft 37 through the arm 39 fast thereon and connected to the reciprocable piece 40 (see Figs. $3^a$, $4^a$, 11, and 12). A spring pressed pawl 41 is pivotally connected to the piece 40 so that in the forward movement of the piece 40 it will engage with a pin $S^4$ of the arm $S^3$ fast on the rock shaft $S^1$, and in its return movement will effect the partial rotation of the shaft $S^1$ against the force of the spring $S^2$, thus freeing the line in the delivery channel. As the piece 40 continues its return movement the rear end of the pawl 41 contacts with a fixed stop 42, thus releasing the pin $S^4$ and permitting the spring $S^2$ to restore the stop S to its normal position in the channel.

*Starting shaft, etc.*—The connected operation of the starting shaft 37 will now be clearly understood (see Fig. 12). After the line is assembled the operator depresses the lever 1, the first effect of which is to elevate the arm 9, thus raising the rear gate 4 to its operative position behind the assembled line. The arm 9 continues to move upward and trips the pawl 6, permitting the delivery slide 3 and rear gate 4 to press the line against the line stop S. As the operator continues to depress the lever 1 the arm 9 is held against further upward movement, but the shaft 37 continues to rotate against the force of the spring 44 previously described. During this time through the connections already indicated the test gage has been steadily advanced through the slot 99, but the expanded member 16 does not reach the end of the line until the latter is released and compressed against the stop S. The arm 46 has similarly been raised to engage the justifying wedge member 47 and the further downward movement of the lever 1 effects the simultaneous movement of the test gage 2 and justifying wedge member 47 as described. During these operations the sliding piece 40 has been advanced and the pawl 41 engaged with the pin $S^4$. The operator now raises the starting lever 1 to its original position, effecting through the shaft 37, the return of the arm 9 to its lowermost position, the withdrawal of the wedge portion 16 of the test gage from the line and its restoration to its normal parallel condition, the withdrawal of the piece 40 and the line stop from the delivery channel, and the return of the arm 46, leaving the justifying wedge member 47 in its adjusted position.

*Delivery position.*—When the line arrives at the end of the delivery channel F to be delivered to the casting mechanism it may be held there in a variety of ways, either by a simple sliding or swinging gate, or by a stop as illustrated in U. S. Letters-Patent to Ottmar Mergenthaler No. 378,797, or by such pawls as are used in the first elevator of the ordinary commercial Mergenthaler linotype machine, or as shown in Letters-Patent No. 678,268, or by any manually operative devices. For the purposes of the present case a simple arrangement is illustrated in Figs. 4, 5, and 6. A spring pressed pawl 64 is attached at each corner of the delivery channel F and in their normal position they will hold the line against further movement. Each of these pawls is shown as provided with a projecting pin 65 which engages grooves 66—66 in the presentation slide W, the grooves 66—66 being so formed as to release the line to permit a word to be transferred to the presentation slide W when the latter is in proper position. It will also be obvious that the word matrices may be transferred by hand to the presentation slide without the aid of either transfer or retaining devices.

*Gate operating means.*—When the assembled line arrives at the end of the delivery channel F, in the manner previously described, the front gate 5 is freed from the line and returns to its original position to permit the composition of a second line while the words of the first line are being cast. This is accomplished by the employment of a constantly reciprocating piece or shover 7 (see Figs. 4 and 9). The shover 7 may be caused to reciprocate in any suitable manner, and is shown for the purposes of illustration in the shape of a head provided with a groove which is engaged by pin 33 on the rotating disk 32, the disk 32 being attached to a pulley 34 which is connected by band 35 to pulley 36 on the main shaft Z (see Fig. 2), through which arrangement a constant reciprocating motion is imparted to the shover 7. The shover 7 is bifurcated in form, being provided with two depending extensions 50 and 51, which straddle the delivery channel F and are located in position to engage respectively the projection 14 of the gate 4 and the projection 15 of the gate 5. When the front gate arrives in proper position the reciprocating member 51 engages the projection 15 and depresses the gate 5 in the slide 11, thereby freeing the gate 5 from the line and permitting the spring 24 through the connections 25 to restore the slide 11 to its original position on the guide bar 12. Any suitable means may be provided for elevating the gate 5 to its normal position in the line, such for instance as a spring connected to the slide 11 and gate 5. Another simple form for elevating the gate 5 into the assembly channel F is that shown in Figs. 1 and $4^a$, and consists of a suitably located cam piece 13, which during the movement of the slide 11 engages the projection 15 and thereby elevates the gate 5 to its normal position in front of the star wheel E and ready for the composition of a new line. As in the before mentioned Letters Patent No. 678,268, the stop S is beveled to permit the return passage of the yielding resistant or front gate 5, although this is unnecessary in the present instance unless the front gate 5 is elevated before reaching the movable stop S. Similarly when the rear gate 4 has delivered the last word of the line to the presentation slide W, in the manner hereinafter to be described, its projection 14 will be located beneath the extension 50 of the reciprocating shover 7, and the gate 4 will be depressed within the slide 3 in such manner as to permit the restoration of the slide 3 to its original position, which restoration is effected by the action of the cam 29 against the spring 27 through the parts already set forth. The descent of the gate 4 effects the tripping of the shaft 8 upon which cam 29 is mounted in the manner subsequently to be described. Unlike gate 5, the gate 4 will not be immediately restored to its operative position but remains down until elevated by the arm 9 upon the starting shaft 37.

*Presentation slide.*—The assembled line is delivered one word at a time from the delivery channel F to the presentation slide W (see Figs. 3, 4 and 5) by the pressure of the rear gate 4. The slide W is guided in the frame 58, which is formed with grooves 59—59 to engage ears 60—60 upon the slide W so that the latter may be moved transversely of the channel F. The slide W (see Fig. 9) is formed internally with a transverse chamber 62 to permit the entrance of the matrices therein and conforming to their shape to sustain them in proper position. The slide W is further provided with a rearwardly extending recess 61, through which the detenting pin 63 passes, the recess 61 being sufficiently elongated to permit the necessary movements of the slide W. At the side of the chamber 62 the slide W is formed with notches 67—67 of the exact size necessary to receive and hold the elongated space blank H (see Figs. $5^a$ and 16). This formation of the slide W insures the delivery of a single word matrix at a time thereto and arrests the following words within the delivery channel F. This position is best indicated in Fig. 5, wherein the pawls 64—64 are shown as separated sufficiently to permit the insertion of the word. The slide W then moves forward to the casting position and the spring actuated pawls 64—64, because of the formation of the grooves 66—66, descend and hold the remainder of the line against the pressure of the rear gate 4 (see Fig. 4). In the position shown in Fig. 5, it will be seen that the word contained within the slide W is held at one side by the detenting pin 63 and at the other side by the engagement of the space blank H with the notches 67—67 in the slide.

The detenting pin 63 (see Fig. 5) normally projects entirely through the slide W and into the delivery channel F, being forced into this position by the suitably arranged spring 641, which spring, however, is not strong enough to withstand the pressure of rear gate 4, and accordingly the detenting pin 63 is held out of its normal position in the channel F so long as any part of the line remains in the delivery channel. It is this displacement of the detenting pin 63 which trips the casting mechanism and causes its continued actuation until the entire number of words be cast. It will be seen from Fig. 5 that the detenting pin 63 when moved rearwardly contacts with and moves the butterfly or cam piece 110 of arm 111 mounted upon rock shaft 112. As will subsequently be described the lower cam shaft 108 will be operated continuously so long as parts 110, 111 and 112 are turned from their normal positions.

The slide W has imparted to it the following movements after receiving the word from the delivery channel: It first moves forward to the mold and assumes the casting position shown in Fig. 9, the projecting portions of the slide entering corresponding depressions in the mold and insuring the absolutely accurate engagement of the characters in the matrices with the mold slot. The word is now cast, and then the slide W withdraws sufficiently from the mold to insure its clearance, and to permit the matrices G to be moved from the chamber 62 to the intermediate elevator (see Figs. 1, 2 and 3). The intermediate elevator 69 is provided with the customary bar to engage the teeth $G^1$ of the matrices G and is capable of vertical movement on the rod 70. The pusher 71 actuated by the arm 167 moves the matrices from the slide W to the intermediate elevator 69, the pusher 71 being formed of such cross-section as to permit it to pass through the recess H¹ of the space blank H. This position of the slide W is shown in Fig. 3. The slide W now withdraws to its extreme outermost position, at which point the pusher 72 actuated by the arm 140 transfers the space blank to the rod T⁴ in the manner already described (see Fig. 3). The slide W then moves inwardly until it again assumes the position shown in Fig. 5, when another word will be transferred thereto and the cycle of operations will be repeated. And, as previously stated, these operations will continue so long as the detenting pin 63 is acted upon by any matrices in the delivery channel.

*Justification.*—The slide W when in the casting position, as shown in Figs. 4 and 9, is in close relation to the justifying or wedge member 47 previously described as constituting one of the mold jaws. The justifying wedge 47 (see Figs. 3, 3ᶜ, 4, 9, and 16) is mounted preferably by a dovetailed connection in the supporting piece 54, which, together with the piece 47, constitutes a double wedge in the manner well understood in the art, so that the elevation of the member 47 increases the thickness of the double wedge but presents an always parallel face to the matrices which are in the casting position. The mold slot proper lies partly behind the piece 47, and the blank part of the logotype cast against the piece 47 and the space blank H of the word matrix constitutes the spacing element of the word. Means whereby the piece 47 is adjusted have been previously described, securing in effect the division of the total space to be filled in the line by the number of words less one and the allotment of this portion to each of the words in the line except the last one, thereby producing a line of logotypes longer than the line of matrices and which together exactly fill out the predetermined length. The proper proportioning of the double wedge piece 47—54, and of the test gage 2—16, to effect this division is a simple matter of mathematical and mechanical calculation and has been already referred to.

As previously indicated, the last word of each line is cast without any spacing portion, and it is therefore necessary to withdraw the member 47 so that for the last word cast no part of the mold slot will lie behind it, in other words, so that the inner end of the mold slot will be in the same vertical plane with the outer surface of the member 47. The connection of the movable member 47 to the stationary member 54 is such that it will normally tend to occupy its lowermost position with relation thereto, which is that necessary for casting a word without any spacing portion thereon, and this position it naturally assumes by gravity, although a spring may be employed if necessary for this purpose. When raised by the arm 46, the wedge member 47 is held in its adjusted position by means of a friction pawl 55 (see Figs. 3ᵈ, 4 and 9). The pawl 55 is pivoted to the stationary member 54 and is drawn into contact with the movable member 47 by the spring 56 connected thereto. The frictional engagement of the pawl 55 embracing the member 47 will hold it in its adjusted position until freed therefrom. The pawl 55 must therefore be tripped before the last word is cast, and this is effected by the depression of the rear gate 4, as previously described. The shank of the gate 4 is extended upwardly and provided with a projection 52, and as the slide 3 moves toward the presentation slide W, the projection 52 advances and passes through the yoke 53 of the shover 7 which is thus formed to permit its passage. The projection 52 is then immediately above the extended end of pawl 55 and when the gate 4 is lowered, the pawl 55 is swung about its pivot, thereby releasing the wedge member 47 and effecting the casting of the last word of the line without a spacing portion thereon. A pin 98 on the movable member 47 at this time engages with the stationary piece 54 and holds the member 47 in position. Any other suitable or equivalent means may be employed to trip the member 47 in order to cast the last word, or if desired it may be shifted by hand. The outer corner of the wedge jaw 47 (see Fig. 3) may be slightly beveled (see Fig. 3) to guide the presentation slide W in its movement to the casting position, in the same manner that the outer corners of the mold jaws are beveled in the regular Mergenthaler linotype machine. The extent of variation in the adjustment of the member 47 is very slight and for practical purposes may be disregarded, although as shown its corner is beveled and a certain amount of lateral play of the slide W in the guide 58 has been allowed for.

*Intermediate elevator.*—As the matrices are ejected one word at a time from the presentation slide W, they are received by the intermediate elevator 69 which is given two operative positions on the vertical rod 70, one in proximity to the presentation slide W, and the other in proximity to the lower position of the main elevator L. In its lowermost position, as shown in full lines in Fig. 14, the intermediate elevator receives and retains the consecutive word matrices which are transferred thereto from the slide W by the pusher 71. After the matrices for the entire line have been delivered thereto, the intermediate elevator rises to the dotted line position shown in the said figures, in proximity to the main elevator L, to which the matrices are transferred by the shifter 73. This employment of an intermediate elevator is to obviate the necessity of frequent movements of the main elevator L, which will therefore rise to its uppermost or distributing position only after a full line has been cast instead of after each word.

*Mold.*—The mold proper may be of any well-known or desired construction, its specific formation constituting no part of this invention. The machine herein illustrated presents a form of mold somewhat similar to that shown and described in U. S. Letters-Patent to Ottmar Mergenthaler No. 313,224, in that it consists of two relatively movable sections X and Y (see Figs. 1, 2, 3, 9, 15, 16 and 19). Three interchangeable molds are shown mounted in a frame 74 which is vertically adjustable in the framework 75 by means of a screw 276 and nuts 277, so that the molds may be readily shifted to meet required conditions. Each mold consists of two sections X and Y which are separately movable within the frame 74. The mold slot or mold proper is formed partly in the section X and partly in the section Y, each of said sections being recessed so as to form on each a side and an end wall for the completed mold, and the length of the mold slot depends upon the relative position assumed by the two sections. The lower mold section Y occupies a constant position during the casting, being moved inward by the rod $Y^1$ and arm 80 until it abuts against a fixed stop constituted by the inner part of framework 75 (see Fig. 16). The upper mold section X is formed with a jaw 76 which holds the presented word matrix closely against the other mold jaw 47 previously described. The engagement of the jaw 76 with the word matrix thus determines the position of the mold section X, and therefore it follows that the length of the mold proper is regulated by the number of letter matrices presented. Motion is imparted to the mold section X by the rod $X^1$ and arm 79, which move the section X into a position where its pin 77 is engaged by the clamping arm 78 at the back of the mold, (see Fig. 19). If desired the arm 79 could be arranged to move section X to its operative position without the assistance of arm 78, although the employment of the latter is regarded as preferable. The arm 78 is mounted upon the rock shaft 147 is encircled by a powerful spring 148, connected respectively with the shaft and frame of the machine and acting through the medium of said shaft and the arm 78 to move the mold section X to its operative position and clamp the word matrix tightly between the jaws 76 and 47, the return movement of the arm being effected by the cam 145, as will be more fully described hereinafter. The pot O then advances into operative position (see Fig. 9), and the pump plungers P are operated to inject the metal. The jaw 76 then releases the matrices which are withdrawn by the presentation slide. The mold sections are then moved toward the other side of the frame 74 to permit the further operations of trimming and ejecting. During this movement the mold is partially opened, and as the two mold sections X and Y pass across the frame the base of the slug is trimmed by the knife R (see Figs. 3 and 19) which is connected to the frame-work in any suitable manner. After the logotype has been trimmed it is brought to the ejecting position and is removed from the mold by the ejector Q (see Figs. 3, 19 and 21). In Fig. 19, the ejector blade Q is shown as passing into and through a slot in the supporting frame $R^1$ of the knife R. However, the specific arrangement and construction of the trimming means, ejecting means, pot and pump constitute no part of this invention, as they are well known in the art and used in many different forms and disclosed in many Letters-Patent, such as Nos. 313,224; 345,525; 347,629; 378,797; 378,798; 436,531; 436,532; and 678,268.

In order to insure the proper relative position of the mold sections X and Y after their adjustment, locking means are employed, as best shown in Figs. 9, 19 and 20, consisting of an arm 81 provided with a cam-like projection and pivoted to the frame 74 in position to bear upon the upper mold section X. The necessary locking motion is imparted to the arm 81 by a hook 82 on an arm 83, which hook 82 is held in operative place to engage the arm 81 by a spring 84 attached to the frame-work 75. The arm 83 receives motion from the rock shaft 147 which carries the clamping arm 78, it being preferably connected thereto by a pin and slot connection 85, in such manner that a certain amount of lost motion is provided for, and the arm 78 is thus permitted to complete its clamping movement before the locking arm 81 is operated. In Figs. 19 and 20, a spring 86 is shown as connected to the frame 74 and bearing upon the upper mold section X to hold the latter in its adjusted position. The spring 86 may be employed as an alternative to the locking arm 81, or in addition to it, in which latter event the arm 81 may if desired bear directly upon the spring (see Fig. 20).

*Mold back.*—As shown in Fig. 9a, the pot mouth O may bear directly upon the rear of the mold sections, and entirely satisfactory results may be obtained in this manner, as in many type and line casting machines now in general use, and as illustrated in some of the Letters-Patent already referred to. Additional means are, however, herein illustrated to prevent the excessive heating of the mold sections due to rapid casting. These means are best shown in Figs. 3, 9, and 19, which show a mold back, or gate former containing the metal inlet, connected to the mold sections but not integral therewith, against which the pot mouth impinges, thus preventing the excessive heating of the mold. The specific form of this device illustrated consists of two scissors-like branches 87 and 88 pivotally mounted upon one of the mold sections such as Y. These branches 87 and 88 are so shaped that in closed position the metal inlet forms a rear extension of the mold slot (see Fig. 19). In order to secure the proper length of the metal inlet, the upper branch 88 is provided with a sliding piece 89 in which the upper portion of the inlet is formed. This sliding piece 89 moves freely upon the branch 88 and is suitably connected to the upper mold section X, as by the pin and slot 90, so that the movement of the upper mold section X is imparted to the sliding piece 89 and the length of the metal inlet is made to correspond with the length of the mold slot. The pivotally mounted branches 87 and 88 are so arranged as to be closed and held in proper position for casting when the mold sections X and Y have been moved and locked in position. Any suitable means may be employed for this purpose, such for instance as the spring 91 to engage the lower branch 87 and the projection 92 to engage the upper branch 88, the end of which is flattened, as shown particularly in Fig. 19, and is extended so that when the mold is moved, this flattened end will engage the coöperating flattened surface of the projection 92, whereby the branch 88 will be swung on its pivot to closed position and held closed. After the word is cast and the mold sections are moved to trim the base of the logotype and to permit its ejection, the pivoted branches 87 and 88 are again opened for these purposes in any suitable manner, such for instance as by contact with a projecting piece on the knife-frame R¹. The frame-work 75 may also be provided with a shield 93 suitably located below the trimming knife R so as to protect the parts beneath from the chips and shavings involved in the trimming process.

*Driving means.*—Power may be imparted to secure the operations above described in any desired or suitable manner, and the specific means therefor constitute no part of the present invention. The form of devices embodied herein will now be briefly described, having particular reference to Figs. 1, 2, 13 and 15. The customary fast and loose pulleys Z³ (see Fig. 2) are mounted upon the main shaft Z, which thereby may be continuously rotated during the operation of the machine. Motion is imparted therefrom to the constantly operated parts of the assembling and distributing mechanisms from the band wheel Z¹ on shaft Z and belt Z² to the pulley Z⁴ on shaft Z⁵, and from shaft Z⁵ by pulley Z⁷ and belt Z⁸ to the distributing mechanism, as in the Letters-Patent No. 678,268, previously referred to. Pulley Z⁶ and band Z⁹ transmit motion to pulley Z¹⁰ on shaft Z¹¹ carrying pulleys Z¹² and Z¹³. The delivery belt B passes around the pulley Z¹² and is thereby continuously actuated. Pulley Z¹³ on shaft Z¹¹ is connected by the band Z¹⁴ to the pulley Z¹⁵ of the space blank restoring wheel U, which is thereby rotated. As previously described, the constantly reciprocating shover 7 receives its actuation from disk 32, pulley 34, belt 35 and wheel 36 on the shaft Z.

*Intermittent motions.*—The remaining operations of the machine are intermittent and are obtained as follows: Pinion 105 fast on main shaft Z meshes into gear wheels 106 and 107 loose respectively on cam shafts 108 and 8. As will appear later, various cams and operating means are suitably connected to the two cam shafts, the lower shaft 108 being called into action by the detenting pin 63, and the upper shaft 8 being called into action by the descent of the rear gate 4 after the delivery of the last word to the presentation slide, in the manner now to be described.

The gear wheel 106 on shaft 108 (see Fig. 2) is provided with a clutch member 118 adapted to be engaged by the clutch member 117 keyed to the shaft. Spring 119 normally tends to engage member 117 with member 118 unless resisted by the lever 115 arranged to lie within a helical groove in the member 117, and a spring 116 normally holds the lever 115 in engagement with the member 117. Lever 115 is connected to the detenting pin 63 by link 114, arm 113, rock shaft 112, arm 111, and cam piece 110 (see Figs. 1 and 2). When the detenting pin 63 is moved from its normal position by the presence of matrices at the end of the delivery channel, it thus withdraws the lever 115 from the groove and permits the engagement of clutch members 117 and 118 thereby imparting rotation to the shaft 108, and the shaft will continue to rotate so long as the detenting pin 63 is in engagement with the cam piece 110, thus insuring the necessary sequence of functions until all the words of the line be cast. When the pin 63 returns to its normal position, spring 116 will restore the several parts and cause the engagement of lever 115 with the groove in clutch member 117, the helical formation of which withdraws the member 117 from the member 118, thus arresting the rotation of the cam shaft 108.

The cam shaft 8 (see Figs. 1, 2ª, 13 and 15) is called into action by substantially similar devices. The gear wheel 107 is formed with a clutch member 128, and the shaft 8 is provided with a clutch member 126 keyed thereto and normally pressed toward the member 128 by the spring 127. The pivoted lever 124 is normally held by the spring 125 in engagement with a helical groove in the member 126. Lever 124 is connected by link 123, arm 122, and rock shaft 121, to the detenting arm 120, arranged in its normal position to be engaged by the gate 4 and projection 14 when the latter descends after having delivered the last word to the presentation slide W, thus effecting the rotation of the cam shaft 8 by the withdrawal of the lever 124 from the groove in the clutch member 126. The slide 3 immediately returns to its initial position and the spring 125 restores the engagement of lever 124 with the groove in clutch member 126, and also the detent arm 120 to its normal position, thus permitting a single rotation of the cam shaft 8. Any equivalent form of connecting means may be employed to impart motion to the shafts 108 and 8, that illustrated being old and well known in a variety of machines, such as stamping presses, etc., etc. Other forms to secure intermittent actuation are shown in some of the Letters-Patent already mentioned.

*Lower cam shaft, etc.*—The cams and connections from the cam shafts to the operative parts may be of any desired construction known in the art, and are somewhat similar to those presented in several of the before mentioned Letters-Patent. A grooved cam 130 is mounted upon the shaft 108 and imparts motion to the arm 79 which operates the upper mold section X by means of the roller arm 131 and rock shaft 132 (see Fig. 2). The groove of cam 130 is so formed as to move the mold section X partly home to the casting position in order to permit the final movement of the mold section by the locking arm 78, as previously described. Grooved cam 133 on shaft 108 (see Fig. 2) through roller arm 134 and rock shaft 135 actuates arm 80 connected to the lower mold section Y, the groove being so formed as to cause the mold section Y to move to its extreme inward position against the framework 75. Grooved cam 137 on shaft 108 (see Fig. 2) through roller arm 134, rock shaft 139, and arm 140 operates the pusher 72 to eject the space blank H from the presentation slide W and engage it with the rod T⁴. Cam 141 on cam shaft 108 by its face groove (see Figs. 2 and 21) through roller arm 142 pivoted on the rod 170 and link 143 effects the movement of the ejector blade Q to move the logotype from the mold and then withdraws the blade to its original position. The actuation of the arm 78 whereby the mold section X is moved to its operative position and the matrices are clamped between the wedge jaw 47 and jaw 76 is effected by the spring 148 mounted on rock shaft 147 carrying arm 78 (see Figs. 2 and 19), the arm 78 being returned to its outermost or inoperative position by the engagement of the roller arm 146 of rock shaft 147 with the cam 145 on the cam shaft 108. And by these means also the locking arm 83 is operated in the manner previously described. The pot O is moved to its operative or casting position (see Figs. 2 and 22) by the engagement of cam 150 on cam shaft 108 with the roller projection 151 connected to pot O. The return of pot O to its inoperative position may be effected by gravity. The operation of pump plungers P is caused by the arm 153 connected to the plungers and pivoted on rod 170, the spring 154 connected to the arm 153 acting to depress the plungers, and the cam 152 on cam shaft 108 acting on arm 153 to raise the plungers P to their inoperative position. The presentation slide W is moved inwardly toward the mold by the spring 158 and outwardly away from the mold by cam 156 on cam shaft 108 (see Figs. 1, 2, 15 and 23), the arm 157 being held in engagement with cam 156 by spring 158 and being connected by link 159, arm 160, and link 161 to the presentation slide. The matrix pusher 71 is operated to move the matrices from the presentation slide to the intermediate elevator 69 (see Figs. 2, 3, 3ª, and 24) by the arm 167 fast on rock shaft 165, the rock shaft 165 being provided with spring 166 to operate the pusher 71, and with the roller arm 164 to engage cam 163 on cam shaft 108, whereby the parts are restored to their original positions.

*Upper cam shaft, etc.*—The operative parts connected to the upper cam shaft 8 are as follows: Cam 171 (see Figs. 1, 2ª, and 15) acts upon roller arm 172 of rock shaft 173, being connected by link 174 to shifter N, which moves the matrices from the main elevator L to the distributing devices K. A spring 177 connected to projection 176 of arm 172 tends to move the parts in the opposite direction, the action of the spring moving the shifter N to its full line position in Fig. 1, and the cam 171 restoring it to the dotted line position. Cam 193 on cam shaft 8 controls the main elevator L (see Figs. 1, 2ª, 15 and 17) through connections J, lever arm 195 and the short roller arm 194, both pivoted on rod 185, the roller arm 194 resting on the cam 193 and the operating arm 195 being connected to the spring 196. The cam 193 acts to raise the arm 195 and the spring 196 to depress it, in somewhat the same manner as in the Letters-Patent No. 678,268, previously referred to, the main elevator having two positions on the vertical rod M as indicated by the full and dotted lines in Fig. 1. The movements of the intermediate elevator 69 are effected by the link 189 connected thereto and to the arm 191 pivotally mounted on rod 185 and provided with roller arm 188 bearing upon cam 130

187 on cam shaft 8 (see Figs. 1, 2ª and 15). A spring 190 acts on arm 191 to depress the intermediate elevator 69 to its lower position and cam 187 to elevate it to its upper position. When the intermediate elevator 69 is in its uppermost position and the main elevator L is in its lowermost position the matrices are transferred from one to the other by the shifter slide 73 (see Figs. 1, 2, 2ª and 15). The rock shaft 184 is provided at its front end with an arm 182 connected by link 183 to the suitably guided shifter 73, and at its inner end with a roller arm 181 bearing upon cam 180 on the cam shaft 8. A coil spring 186 connected to rock shaft 184 operates the shifter 73 and the cam 180 restores the parts to their original positions. The cam 29 (see Figs. 1, 2ª and 18) mounted on the cam shaft 8, in conjunction with the spring 27, acts to move the delivery slide 3 and rear gate 4 in the manner already described.

*Completed logotypes.*—As the logotypes are ejected from the mold they may be received in a galley or other receptacle not shown, and may be assembled by hand in proper order for printing, or suitable mechanism for transferring and assembling the line in the galley may be provided if desired. These features, however, form no part of the invention illustrated. If desired an arm 94 (see Figs. 1 and 15) may be employed to move the logotypes in the galley, and suitable motion may be imparted thereto by any convenient means. For the purposes of illustration such a reciprocating motion is transmitted to the arm 94 by the link 95 and pivoted lever 96, so located as to be actuated by the pin 97 on the arm 79, which has been selected as a convenient means for imparting the desired motion. A spring 200 connected to arm 94 restores the parts after their actuation. But as before stated, means for arranging the logotypes after they are cast form no part of the present invention.

*Alternative forms.*—As already indicated many variations may be made in the application of the broad principles of the invention. For instance, certain alternative forms are presented in Figs. 25 and 26, the general ideas remaining the same. Thus the jaw 761 is connected to the mold section Y¹⁰, which is therefore adjusted to the width of the word matrix, instead of the section X, as previously described. The intermediate elevator 691 is shown as connected to an arm 206 mounted upon rock shaft 207, whereby it is moved from its lowermost position to one in proper relation to the main elevator L¹⁰. The pusher 711 is shown as actuated from rock shaft 1651, arm 1671, and link 208, and the pusher itself is of different cross section. A channel T²⁰ received the space blanks H from the presentation slide W, in place of the rod T⁴ previously described. The detenting pin 631 is shown as bearing against a starting lever 1111, and a fixed stop 205 is provided to prevent excess motion thereof. The operation of presentation slide W and of jaws 471 and 761 is substantially the same as previously described.

In Figs. 27 and 28 a different arrangement of the test gage and justifying wedge is presented. The segment 218 is provided with teeth on its inside portion adapted to engage the detent 219 formed on the main branch 250 and to be actuated by the pawl 221 on elbow lever 222, as previously described. The test gage is formed with a projection 210 in position to be engaged by a fixed arm 491 on rock shaft 371, thus providing for a certain amount of lost motion when the starting lever 500 is moved. In this instance the justifying wedge 472 and abutments 541—541 are shown as inclined in the opposite direction to that illustrated in the arrangement previously described, and accordingly the member 472 is lowered instead of raised to secure the necessary justification. This movement of the member 472 may be secured from the rock shaft 371 by any suitable means, such for instance as the arm 461 fast thereon and connected to the member 472, or the arm 461 may be yieldingly mounted thereon. When this form is employed, it will be noted that the wedge member 472 will be restored to its upper or inoperative position by the return movement of the rock shaft 371, which need not be operated until the last logotype of the line is to be cast. Any suitable means may be employed to withdraw the test gage from its forward position as shown in Fig. 27, or it may be removed therefrom by hand.

Fig. 29 shows another alternative form of construction, the starting shaft 372 being arranged nearer the front of the machine. An arm 492 fast on rock shaft 372 engages the front end of test gage 251 and draws it across the assembly channel F when the starting lever 501 is operated. An arm 462 on rock shaft 372 and interponent 215 simultaneously raise the justifying member 473 which is then held in adjusted position by friction pawl 551 and spring 561. When the starting lever 501, rock shaft 372 and connected parts have resumed their normal positions the justifying member 473 may be freed manually from engagement with the pawl 551, or the pawl may be tripped by other suitable means. Fig. 29 shows also a matrix escapement 212, connection 213 and key 214 whereby matrix is delivered through channel 211 to the assembly channel F. The mold sections X and Y, mold back 87—89, and matrices G are substantially the same as those previously described, although different forms of pot and pump are illustrated.

Having thus described the invention, its construction and mode of operation, what is claimed and desired to be secured by Letters-Patent of the United States is as follows:

1. The combination of an elevator and intermediate receiving means with means to transfer groups of matrices successively to the intermediate receiving means and additional means to transfer the several groups of matrices sumultaneously from the intermediate receiving means to the elevator.

2. The combination of an intermediate elevator and means to transfer groups of matrices successively thereto with a main elevator and means to transfer the matrices from the intermediate elevator to the main elevator.

3. The combination of an intermediate elevator and means to transfer groups of matrices successively thereto with a main elevator and means to move the intermediate elevator to the main elevator and to shift the matrices thereto.

4. An adjustable mold provided with locking jaws, one of the jaws being connected to a movable section of the mold, and the other jaw consisting of an adjustable wedge.

5. In a typographic machine, the combination of a slide, a gate sustained thereby and movable relatively thereto in a vertical direction and in opposite directions, actuating means for the slide, and automatic means for moving the gate vertically with reference to the slide and in opposite directions; whereby the gate may be withdrawn vertically from active relation to the line, restored to its initial position, and finally again moved vertically to active position.

6. A space blank restoring device comprising a curved rod provided with a receiving portion and with a delivery portion distant therefrom, and means to advance the separated space blanks onto the receiving portion; whereby they may be caused to leave the rod at a point separated from the point of delivery thereon.

7. A space blank restoring device comprising a curved rod to support the space blanks and a rotating wheel to advance the space blanks thereon.

8. A space blank mechanism comprising a curved guide, an escapement at one end of the guide, means to restore the space blanks to the other end of the guide, and a rotating wheel to advance the space blanks along the guide.

9. The combination of a starting shaft, a transfer slide, a test gage, an adjustable mold member, a line stop, and means actuated from the starting shaft to trip the transfer slide, advance the test gage, adjust the mold member, and withdraw the line stop.

10. The combination of an assembled line of matrices, a suitably actuated transfer slide therefor, means for restoring the slide, and a tripping device for said restoring means actuated by the slide.

11. The combination of the casting mechanism, an assembled line of matrices, a suitably actuated delivery slide therefor, and means actuated by the delivered matrices to start the casting mechanism, together with restoring means for the delivery slide, and a tripping device for said restoring means actuated by the delivery slide.

12. The combination with a composite word matrix, having a plurality of individual matrices and a separator, of an adjustable mold and means for automatically adjusting said mold to cast from said matrix a logotypes having a justifying space thereon.

13. The combination with a composite word matrix, having a plurality of individual matrices and a separator, of an adjustable mold, and means for automatically adjusting said mold to cast from said matrix a logotype having a justifying space thereon, a portion of the said space being cast against the separator.

14. The combination with a composite word matrix, having a plurality of individual matrices and a separator, of a mold provided with a justifying member, and means for casting from said matrix a logotype having a justifying space thereon, the said space being cast partly against the separator and partly against the justifying member.

15. The combination with a composite word matrix, having a plurality of individual matrices and a separator, of a mold provided with an adjustable member, and means for automatically adjusting said member to cast from said matrix a logotype having a justifying space thereon, the said space being cast partly against the separator and partly against the adjustable member.

16. The combination with a composite word matrix, having a plurality of individual matrices and a separator, of an adjustable mold, and means for adjusting said mold to cast from said matrix a logotype having a justifying space thereon, the said space being cast partly against the separator.

17. The combination with a composite matrix, composed of a plurality of individual matrices and a separator, of an adjustable mold and means for adjusting the mold to correspond to said matrix.

18. The combination with a composite matrix, composed of a plurality of individual matrices and a separator, of an adjustable mold and automatic means for adjusting the mold to correspond to said matrix.

19. The combination with a mold of means for successively presenting word matrices thereto, each word matrix consisting of a plurality of individual matrices and a separator, and means for independently adjusting the mold for each word matrix.

20. The combination of a mold with means for successively presenting word matrices thereto, each word matrix consisting of a plurality of individual matrices and a separator.

21. The combination with casting mechanism of means for detaching word matrices from a line thereof and presenting them successively to the casting mechanism, each word matrix consisting of a plurality of individual matrices and a separator.

22. The combination with casting mechanism, matrix removing means, and separator removing means, of a device for successively presenting a word matrix, consisting of a plurality of individual matrices and a separator, to the casting mechanism, the matrix removing means, and the separator removing means.

23. The combination of an assembled line of matrices, line delivering devices, and adjustable mold member, devices to measure the assembled line of matrices and to adjust the mold member, means to hold the mold member in its adjusted position, and further means to release the mold member actuated by the line delivering devices.

24. The combination with a mold, of mechanism for presenting word matrices successively to the mold, each word matrix consisting of a plurality of individual matrices and a separator, and mechanism for casting logotypes successively from said word matrices.

25. The combination of means for assembling word matrices, each consisting of a plurality of individual matrices and a separator, a mold, means for presenting the word matrices successively to the mold, and mechanism for casting logotypes successively in said mold.

26. The combination of a plurality of interchangeable molds and means whereby they may be moved in a straight path to bring any desired mold into operative position.

27. The combination of a plurality of interchangeable molds, means for supporting and guiding them in a straight path, and means whereby they may be moved therein to bring any desired mold into operative position.

28. The combination of an adjustable mold with an adjustable gate former containing the metal inlet and connections whereby the adjustment of the mold similarly adjusts the metal inlet.

29. The combination of a mold with a gate former containing the metal inlet and means to close the gate former during the casting operation and to open it thereafter.

30. In a typographic machine, the combination of casting means and a matrix element, the said casting means comprising an adjustable mold frame and a plurality of independent molds mounted therein so as to be bodily movable to different points thereof.

31. In a typographic machine, the combination of casting means and a matrix element, the said casting means comprising an adjustable mold frame and a plurality of independent slidable molds mounted therein so as to be bodily movable to different points thereof.

In testimony whereof, we have hereunto set our hands this 4th day of February 1904. in the presence of two subscribing witnesses.

SAFE DEPOSIT AND TRUST
COMPANY OF BALTIMORE,
By JNO. W. MARSHALL, S. V. P.,
ABNER GREENLEAF,
*Executors of the last will and testament of*
*Ottmar Mergenthaler, deceased.*

In presence of—
WM. WOODWARD CLOUD,
I. A. FAIRGRIEVE.